United States Patent [19]
Xu

[11] Patent Number: 6,000,612
[45] Date of Patent: Dec. 14, 1999

[54] PORTABLE DATA COLLECTION DEVICE HAVING OPTICAL CHARACTER RECOGNITION

[75] Inventor: Jianhua Xu, Bothell, Wash.

[73] Assignee: Metanetics Corporation, Fort Meyers, Fla.

[21] Appl. No.: 08/949,073

[22] Filed: Oct. 10, 1997

[51] Int. Cl.⁶ .................................................. G06K 7/10
[52] U.S. Cl. ............... 235/454; 235/462.11; 235/462.45; 235/475.01; 382/176
[58] Field of Search .................................... 235/454, 470, 235/469, 465, 462.11, 462.45, 472.01; 382/173, 176, 177

[56] References Cited

U.S. PATENT DOCUMENTS

| | | | |
|---|---|---|---|
| 4,409,470 | 10/1983 | Shepard et al. | 235/472.01 |
| 4,766,300 | 8/1988 | Chadima et al. | 235/472.01 |
| 5,010,580 | 4/1991 | Vincent et al. | 382/17 |
| 5,019,699 | 5/1991 | Koenck | 235/472.01 |
| 5,038,392 | 8/1991 | Morris et al. | 382/61 |
| 5,077,809 | 12/1991 | Ghazizadeh | 382/33 |
| 5,080,456 | 1/1992 | Katz et al. | 235/462.01 |
| 5,130,520 | 7/1992 | Shepard et al. | 235/472.01 |
| 5,131,053 | 7/1992 | Bernzott et al. | 382/9 |
| 5,168,149 | 12/1992 | Dvorkis et al. | 235/472.01 |
| 5,187,356 | 2/1993 | Chadima et al. | 235/472.01 |
| 5,200,597 | 4/1993 | Eastman et al. | 235/455 |
| 5,210,398 | 5/1993 | Metlitsky | 235/462.01 |
| 5,258,604 | 11/1993 | Behrens et al. | 235/462.01 |
| 5,262,871 | 11/1993 | Wilder et al. | 358/213.11 |
| 5,278,397 | 1/1994 | Barkan et al. | 235/462.01 |
| 5,296,690 | 3/1994 | Chandler et al. | 235/462.01 |
| 5,308,966 | 5/1994 | Danielson et al. | 235/472.01 |
| 5,309,243 | 5/1994 | Tsai | 348/221 |
| 5,314,631 | 5/1994 | Katoh et al. | 235/472.01 |
| 5,331,143 | 7/1994 | Marom et al. | 235/472.01 |
| 5,340,973 | 8/1994 | Knowles et al. | 235/472.01 |
| 5,349,172 | 9/1994 | Roustaei | 235/472.01 |
| 5,354,977 | 10/1994 | Roustaei | 235/472.01 |
| 5,406,063 | 4/1995 | Jelen | 235/472.01 |
| 5,414,251 | 5/1995 | Durbin | 235/462.01 |
| 5,418,357 | 5/1995 | Inoue et al. | 235/472 |
| 5,420,943 | 5/1995 | Mak | 382/313 |
| 5,468,947 | 11/1995 | Danielson et al. | 235/472.01 |
| 5,478,997 | 12/1995 | Bridgelall et al. | 235/462.01 |
| 5,486,688 | 1/1996 | Iima et al. | 235/462.01 |
| 5,496,992 | 3/1996 | Madan et al. | 235/472.01 |

(List continued on next page.)

FOREIGN PATENT DOCUMENTS

| | | |
|---|---|---|
| 6-129891 | 7/1985 | Japan . |
| 63-67692 | 3/1988 | Japan . |
| 63-83886 | 4/1988 | Japan . |
| 2-264383 | 10/1990 | Japan . |
| 3-198175 | 8/1991 | Japan . |
| 5-242287 | 9/1993 | Japan . |
| 6-162247 | 6/1994 | Japan . |

*Primary Examiner*—Donald Hajec
*Assistant Examiner*—Daniel St. Cyr
*Attorney, Agent, or Firm*—Watts, Hoffmann, Fisher & Heinke, Co., L.P.A.

[57] ABSTRACT

A portable data collection device providing for optical character recognition. A housing defines an internal region and includes a user handle that allows a user to position the housing relative to an indicia carrying target. An imaging assembly includes a two dimensional imaging array supported within the internal region of the housing. The imaging assembly includes a capture circuit that generates a video signal representative of an image of a target zone. An optics assembly supported by the housing focuses an image of the target area onto the photosensor array. A character recognition processing circuit receives the video signal and categorizes the indicia on the target into a set of predefined characters. The character recognition processing circuit includes a discriminator for identifying a text region of the target and identifying individual character regions within the text region and a categorizer for identifying a character from a set of possible characters for an individual character region. The categorizer performs one or more tests based on pixel data within the individual character region.

15 Claims, 20 Drawing Sheets

U.S. PATENT DOCUMENTS

| | | | |
|---|---|---|---|
| 5,504,316 | 4/1996 | Bridgelall et al. | 235/462.01 |
| 5,512,739 | 4/1996 | Chandler et al. | 235/462.04 |
| 5,581,635 | 12/1996 | Zhu et al. | 382/245 |
| 5,691,773 | 11/1997 | Wang et al. | 235/472.01 |
| 5,703,349 | 12/1997 | Meyerson et al. | 235/472.01 |
| 5,714,745 | 2/1998 | Ju et al. | 235/469 |
| 5,754,684 | 5/1998 | Kim | 382/176 |
| 5,841,121 | 11/1998 | Koenck | 235/472.01 |

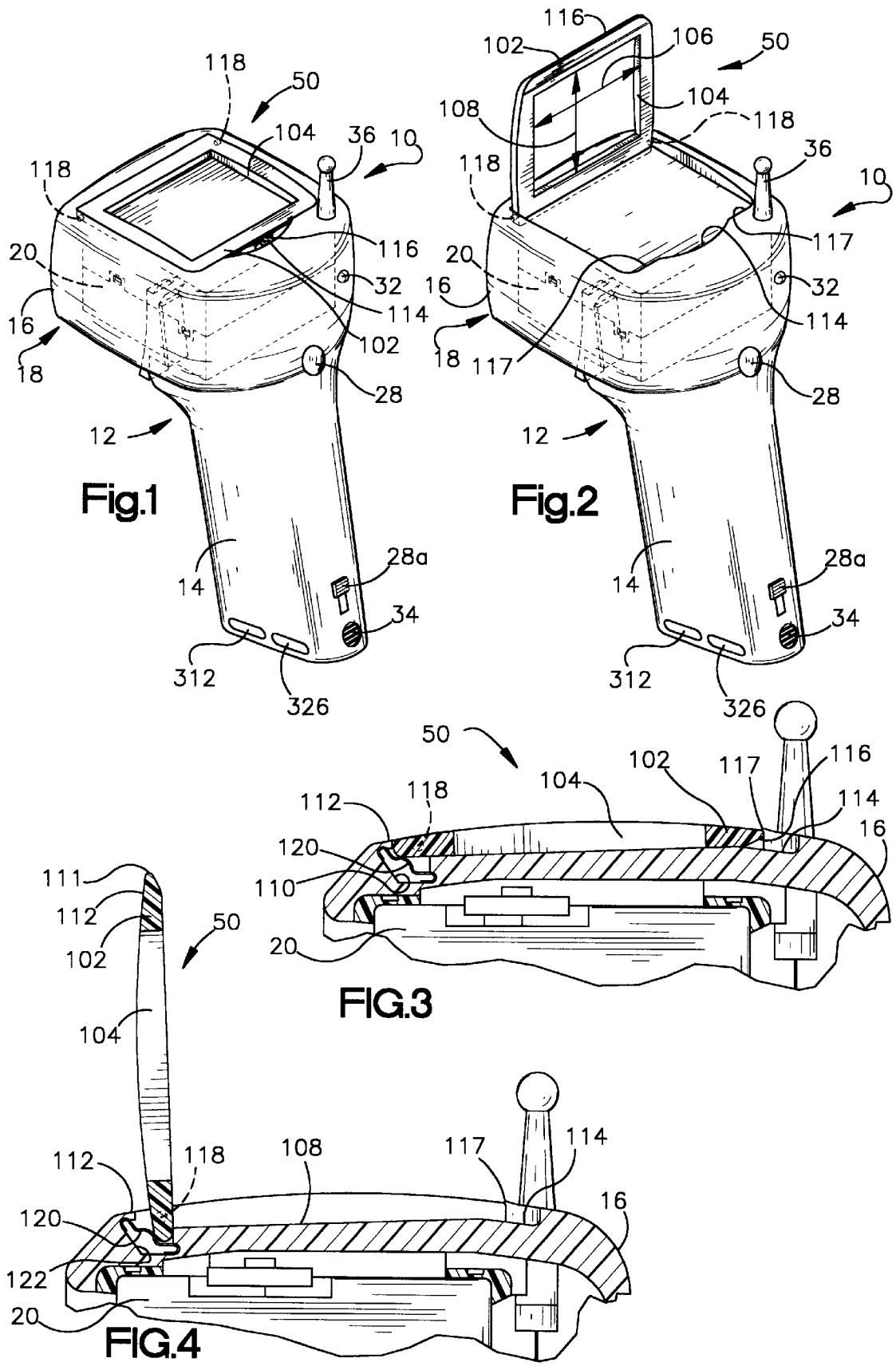

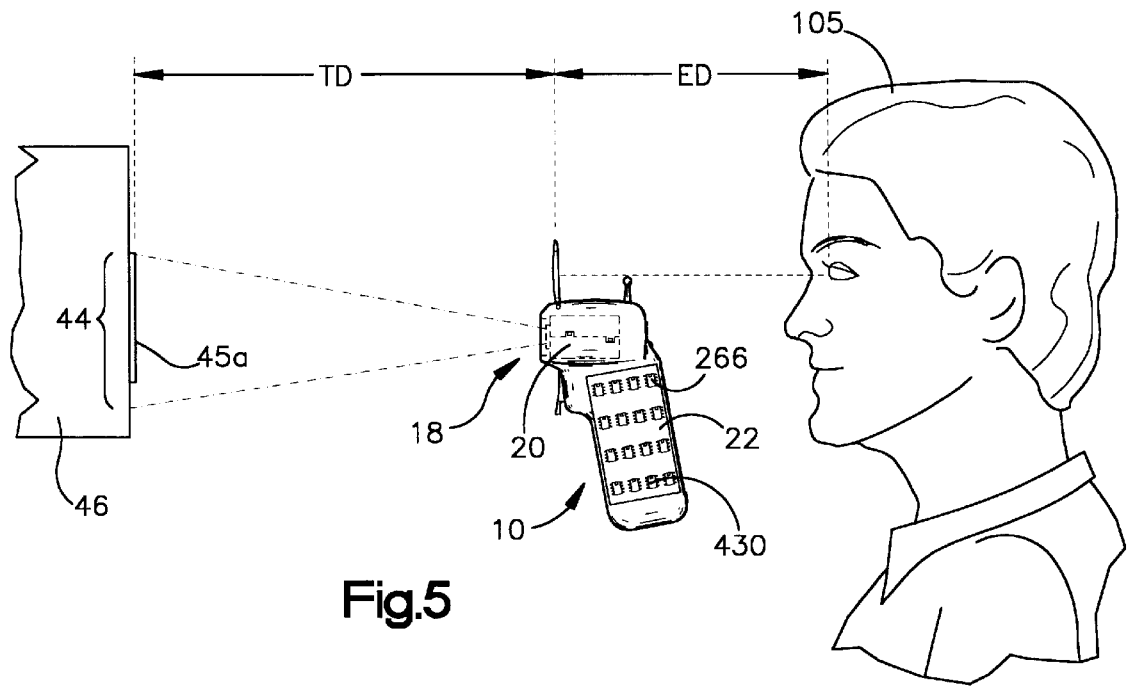
Fig.5
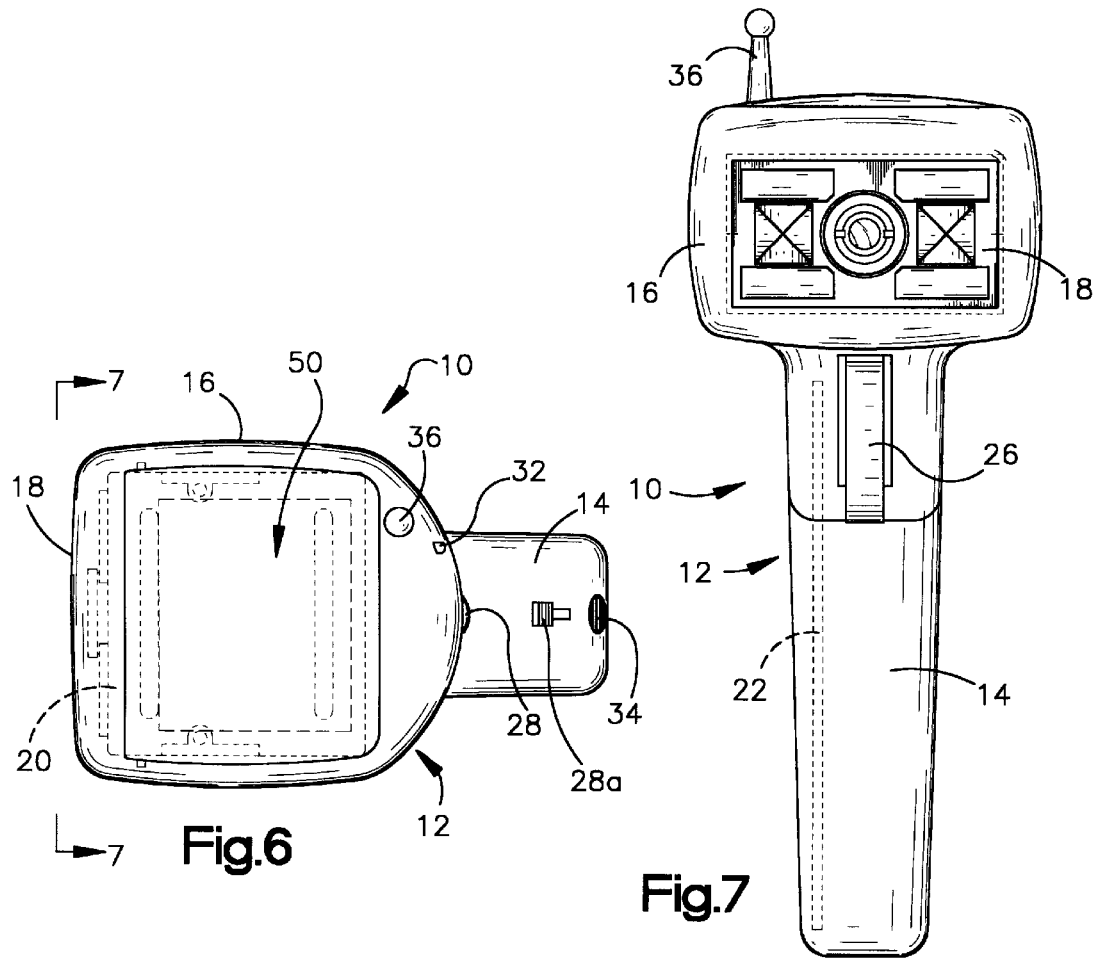
Fig.6
Fig.7

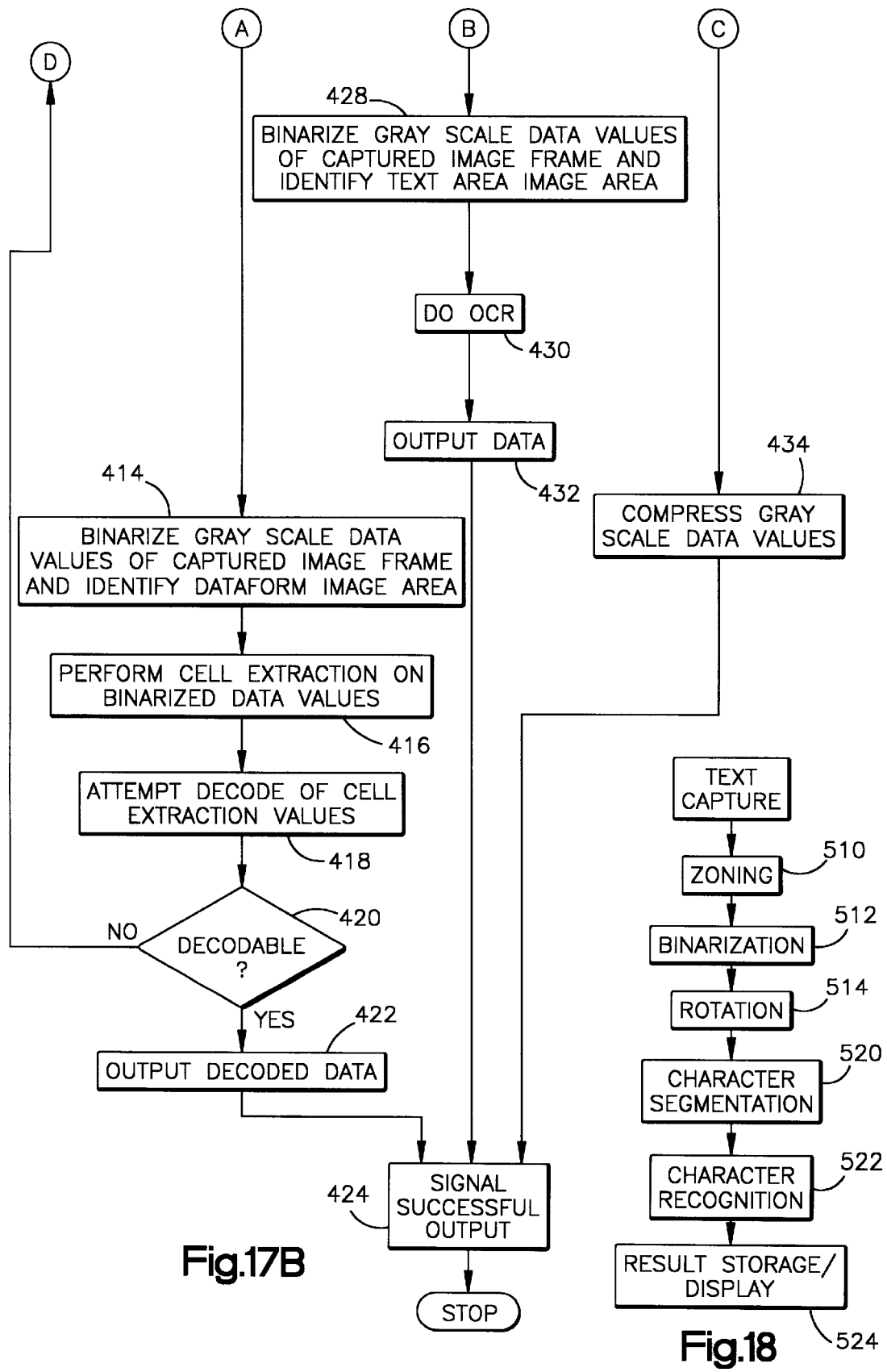

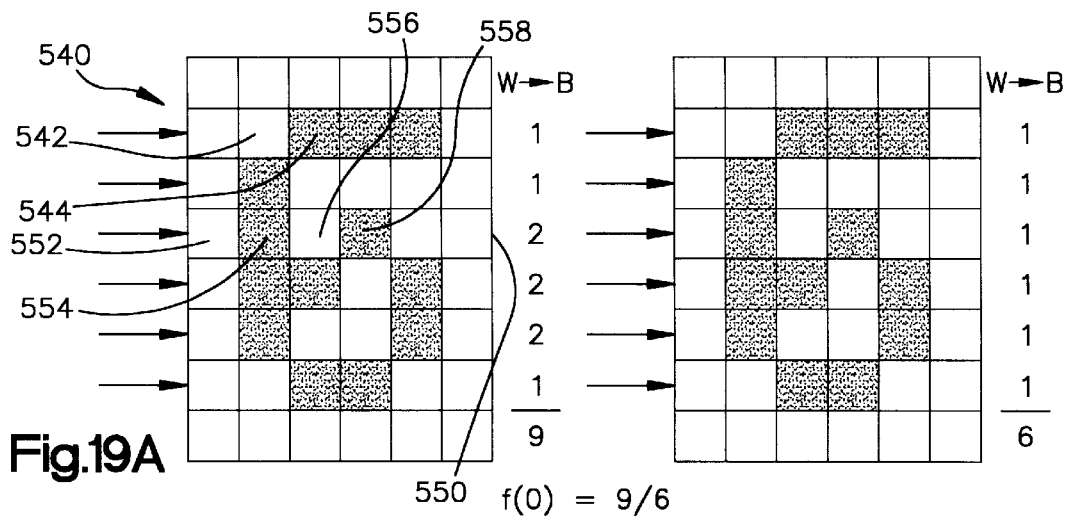
Fig.19A
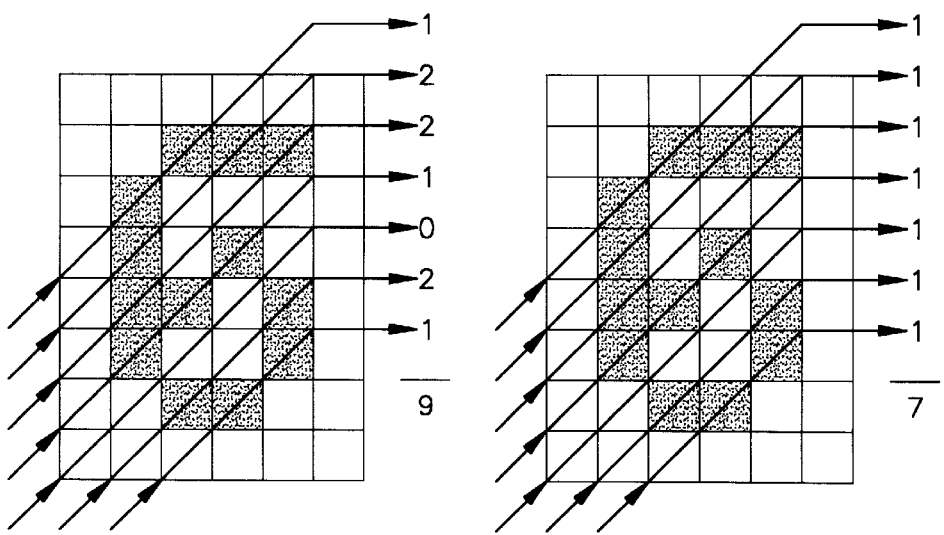
Fig.19B
Fig.19C

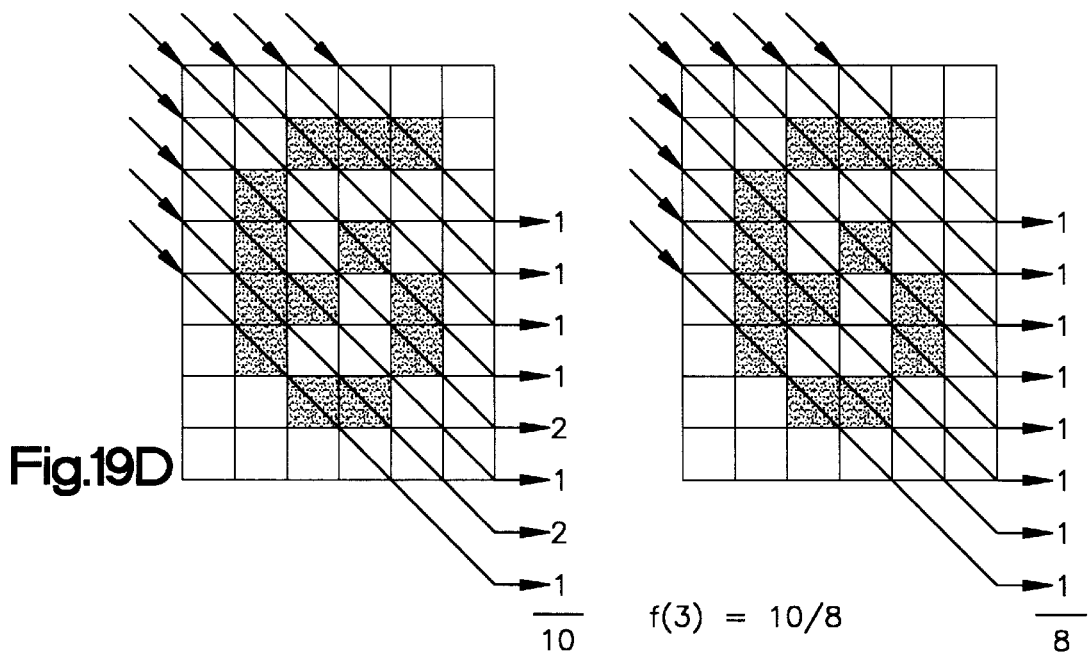
Fig.19D    f(3) = 10/8
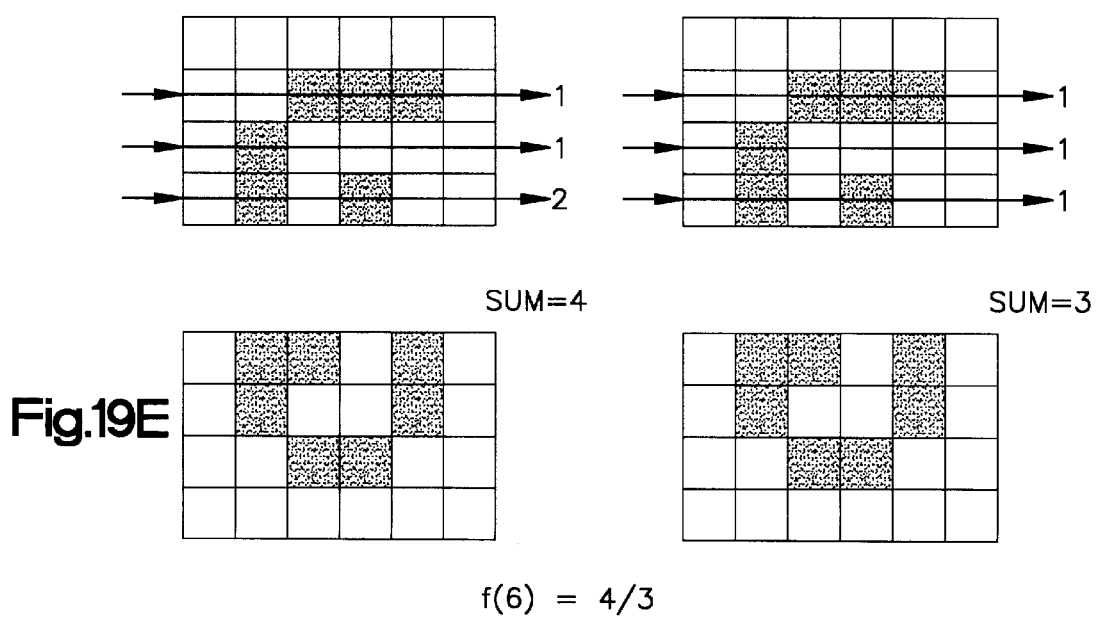
Fig.19E    f(6) = 4/3

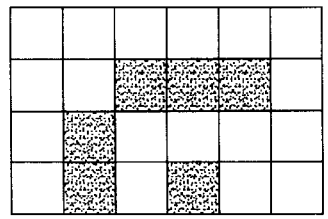
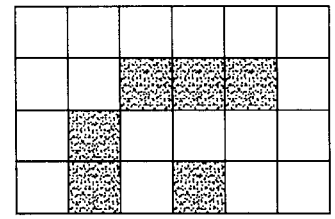
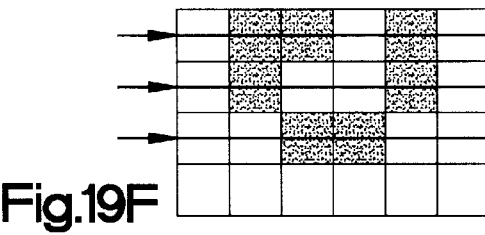
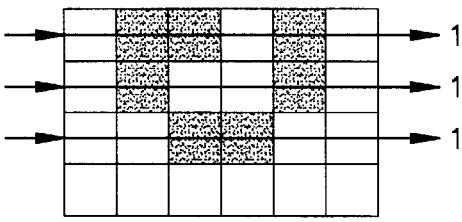
Fig.19F
SUM=5
f(7) = 5/3
SUM=3
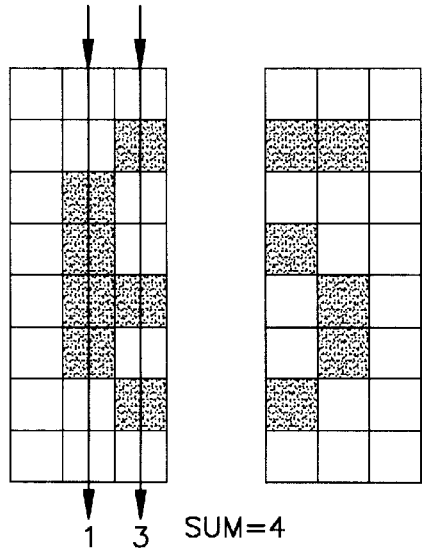
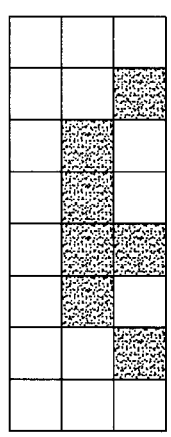
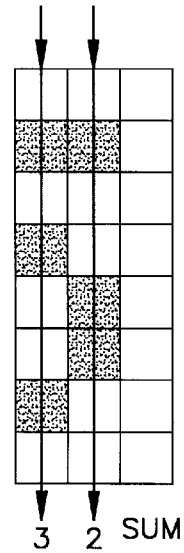
1  3  SUM=4
3  2  SUM=5
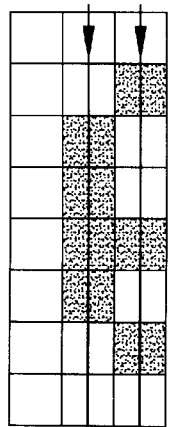
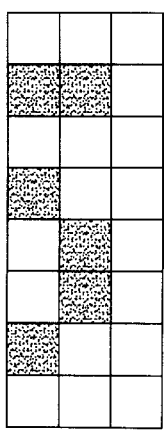
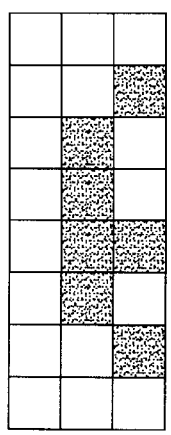
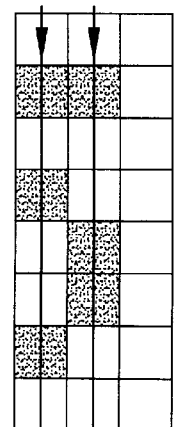
Fig.19G   1 1  SUM=2
f(8) = 4/2=2
Fig.19H   1 1  SUM=2
f(9) = 5/2

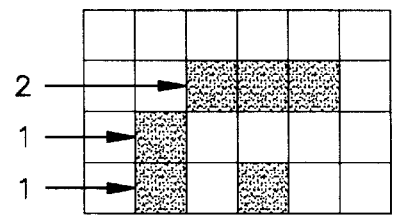
$$f(10) = \frac{2+1+1}{3}$$
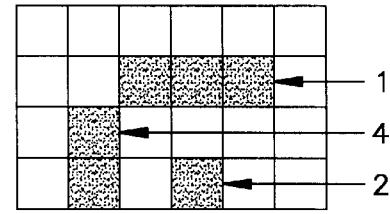
$$f(12) = \frac{1+4+2}{3}$$
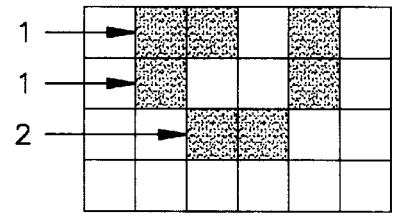
$$f(11) = \frac{1+1+2}{3}$$ Fig.19I $$f(13) = \frac{1+1+2}{3}$$
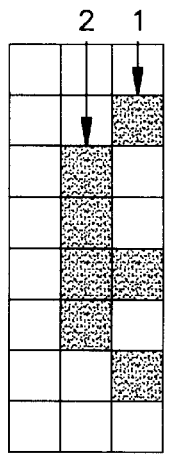 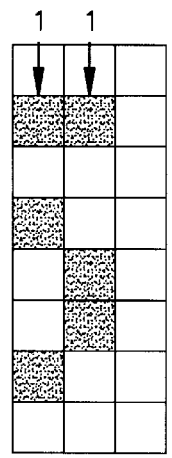
$$f(16) = \frac{2+1}{2} \qquad f(17) = \frac{1+1}{2}$$
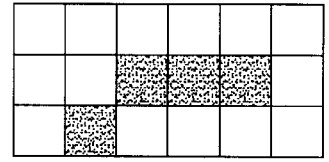
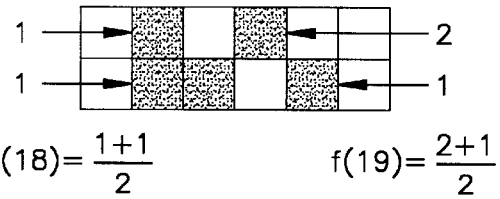
$$f(18) = \frac{1+1}{2} \qquad f(19) = \frac{2+1}{2}$$
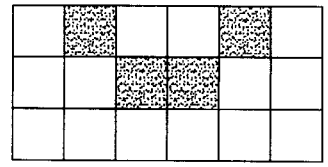
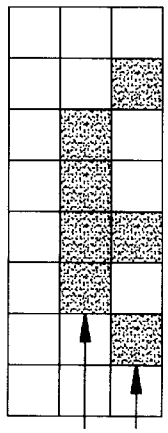 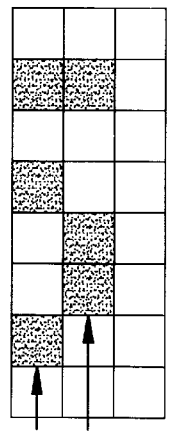
Fig.19K
Fig.19J
$$f(14) = \frac{2+1}{2} \qquad f(15) = \frac{1+2}{2}$$

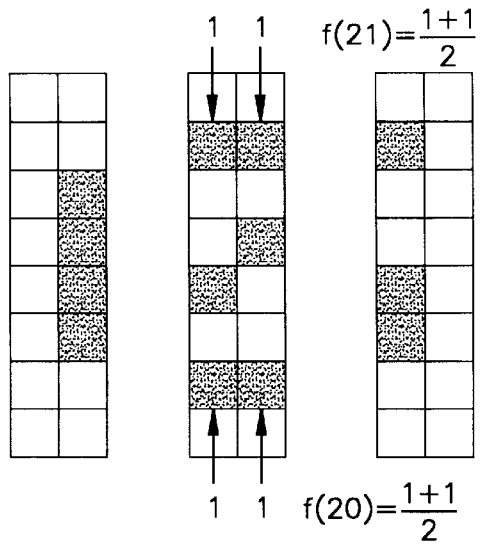
Fig.19L
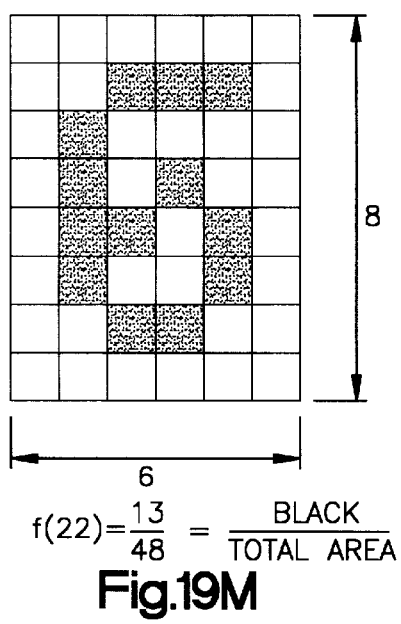
Fig.19M
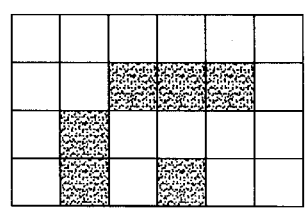
Fig.19N
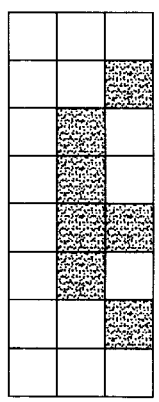 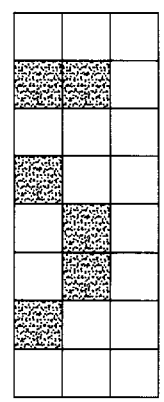
Fig.19O
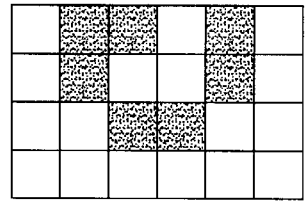
Fig.19P

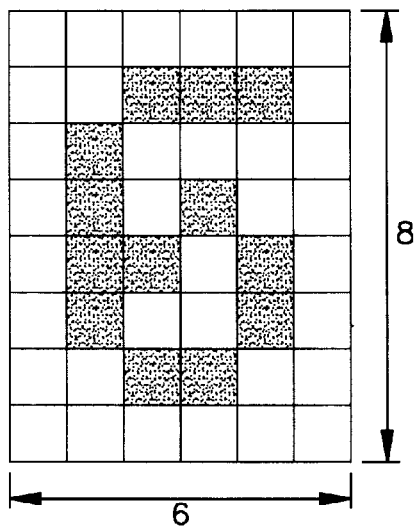
$$f(31) = \frac{6}{6+8}$$
$$f(32) = \frac{4}{6+8}$$
Fig.19Q
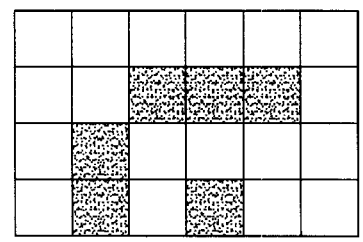
$$f(33) = \frac{6}{6+7}$$
Fig.19R
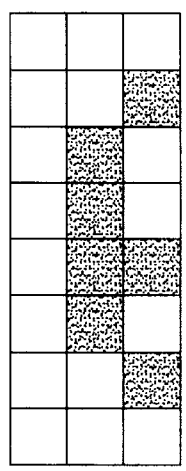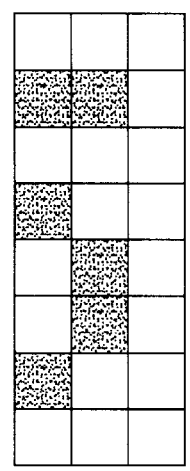
$$f(34) = \frac{7}{6+7}$$
Fig.19S

| | ↔ | ↕ | ↘ | ↙ | MEAN ($\bar{f}$) | VARIANCE ($\delta$) | ▬ | ▬ | ▮ | ▮ | ▬ | ▬ |
|---|---|---|---|---|---|---|---|---|---|---|---|---|
| | $f_0$ | $f_1$ | $f_2$ | $f_3$ | $f_4$ | $f_5$ | $f_6$ | $f_7$ | $f_8$ | $f_9$ | $f_{10}$ | $f_{11}$ |
| 0 | 1.81 | 1.74 | 1.70 | 1.70 | 1.75 | 0.12 | 1.79 | 1.84 | 1.87 | 1.76 | 0.08 | 0.06 |
| 1 | 1.03 | 1.33 | 1.00 | 1.12 | 1.12 | 0.29 | 1.05 | 1.00 | 1.13 | 1.53 | 0.41 | 0.62 |
| 2 | 1.23 | 2.23 | 1.09 | 1.53 | 1.52 | 0.89 | 132 | 1.11 | 2.03 | 2.51 | 0.43 | 0.29 |
| 3 | 1.37 | 2.24 | 1.50 | 1.49 | 1.65 | 0.70 | 1.34 | 1.36 | 2.07 | 2.49 | 0.38 | 0.34 |
| 4 | 1.41 | 1.51 | 1.38 | 1.54 | 1.46 | 0.18 | 1.47 | 1.42 | 1.55 | 1.53 | 0.35 | 0.32 |
| 5 | 1.38 | 2.49 | 1.58 | 1.57 | 1.75 | 0.87 | 1.32 | 1.49 | 2.65 | 2.42 | 0.04 | 0.33 |
| 6 | 1.65 | 2.37 | 1.77 | 1.72 | 1.88 | 0.58 | 1.50 | 1.81 | 2.22 | 2.59 | 0.11 | 0.09 |
| 7 | 1.06 | 1.50 | 1.00 | 1.26 | 1.21 | 0.40 | 1.12 | 1.00 | 1.55 | 1.54 | 0.51 | 0.41 |
| 8 | 1.71 | 2.48 | 1.74 | 1.75 | 1.92 | 0.65 | 1.65 | 1.72 | 2.49 | 2.54 | 0.11 | 0.10 |
| 9 | 1.63 | 2.45 | 1.78 | 1.68 | 1.88 | 0.66 | 1.82 | 1.46 | 2.55 | 2.43 | 0.07 | 0.34 |

Fig.20A

| | ▬ | ▬ | ▮ | ▮ | ▮ | ▮ | ▬ | ▬ | ▮ | ▮ | AREA | PERIMETER |
|---|---|---|---|---|---|---|---|---|---|---|---|---|
| | $f_{12}$ | $f_{13}$ | $f_{14}$ | $f_{15}$ | $f_{16}$ | $f_{17}$ | $f_{18}$ | $f_{19}$ | $f_{20}$ | $f_{21}$ | $f_{22}$ | $f_{23}$ |
| 0 | 0.11 | 0.11 | 0.06 | 0.11 | 0.07 | 0.11 | 0.01 | 0.03 | 0.02 | 0.02 | 0.17 | 0.55 |
| 1 | 0.06 | 0.07 | 0.76 | 0.28 | 0.10 | 0.05 | 0.65 | 0.06 | 0.68 | 0.07 | 0.10 | 0.44 |
| 2 | 0.10 | 0.33 | 0.02 | 0.06 | 0.19 | 0.10 | 0.68 | 0.18 | 0.01 | 0.01 | 0.17 | 0.58 |
| 3 | 0.11 | 0.09 | 0.06 | 0.06 | 0.10 | 0.09 | 0.70 | 0.09 | 0.01 | 0.01 | 0.18 | 0.57 |
| 4 | 0.22 | 0.17 | 0.27 | 0.19 | 0.35 | 0.27 | 0.15 | 0.21 | 0.25 | 0.14 | 0.18 | 0.53 |
| 5 | 0.42 | 0.08 | 0.07 | 0.08 | 0.04 | 0.13 | 0.26 | 0.18 | 0.03 | 0.01 | 0.19 | 0.58 |
| 6 | 0.27 | 0.08 | 0.09 | 0.07 | 0.11 | 0.10 | 0.02 | 0.14 | 0.03 | 0.01 | 0.22 | 0.58 |
| 7 | 0.10 | 0.42 | 0.44 | 0.48 | 0.01 | 0.02 | 0.60 | 0.25 | 0.17 | 0.01 | 0.14 | 0.56 |
| 8 | 0.12 | 0.08 | 0.07 | 0.05 | 0.08 | 0.09 | 0.11 | 0.10 | 0.02 | 0.01 | 0.24 | 0.60 |
| 9 | 0.05 | 0.06 | 0.07 | 0.06 | 0.06 | 0.05 | 0.23 | 0.00 | 0.00 | 0.00 | 0.22 | 0.58 |

Fig.20B

| | CIRCULARITY | INTEGRAL CONCAVITY | EULER NUMBER | AREA LEFT | AREA RIGHT | AREA UP | AREA DOWN | $\frac{w}{h+w}$ | $\frac{h}{h+w}$ | AREA RATIO (L/L+R) | AREA RATIO (U/U+D) |
|---|---|---|---|---|---|---|---|---|---|---|---|
| | $f_{24}$ | $f_{25}$ | $f_{26}$ | $f_{27}$ | $f_{28}$ | $f_{29}$ | $f_{30}$ | $f_{31}$ | $f_{32}$ | $f_{33}$ | $f_{34}$ |
| 0 | 28.51 | 0.31 | 0.06 | 0.20 | 0.21 | 0.20 | 0.21 | 0.58 | 0.42 | 0.84 | 0.90 |
| 1 | 32.65 | 0.39 | 1.00 | 0.10 | 0.41 | 0.28 | 0.20 | 0.00 | 0.27 | 0.23 | 0.69 |
| 2 | 32.41 | 0.38 | 1.03 | 0.19 | 0.23 | 0.18 | 272 | 0.00 | 0.40 | 0.81 | 0.79 |
| 3 | 29.86 | 0.34 | 1.03 | 0.15 | 0.27 | 0.20 | 0.21 | 0.00 | 0.40 | 0.52 | 0.89 |
| 4 | 25.20 | 0.37 | 0.09 | 0.15 | 0.26 | 0.17 | 0.23 | 0.00 | 0.43 | 0.54 | 0.74 |
| 5 | 28.19 | 0.32 | 1.03 | 0.24 | 0.22 | 0.25 | 0.22 | 0.00 | 0.39 | 0.86 | 0.84 |
| 6 | 23.94 | 0.30 | 0.06 | 0.26 | 0.23 | 0.25 | 0.25 | 0.00 | 0.42 | 0.87 | 0.86 |
| 7 | 36.79 | 0.47 | 1.00 | 0.13 | 0.23 | 0.20 | 0.13 | 0.00 | 0.40 | 0.55 | 0.61 |
| 8 | 23.34 | 0.30 | -0.97 | 0.25 | 0.27 | 0.27 | 0.27 | 0.00 | 0.42 | 0.90 | 0.88 |
| 9 | 24.35 | 0.30 | 0.06 | 0.22 | 0.29 | 0.26 | 0.26 | 0.59 | 0.41 | 0.76 | 0.89 |

WHERE: h= HEIGHT
       w= WIDTH
       l= LEFT
       r= RIGHT
       u= UP
       d= DOWN

Fig.20C

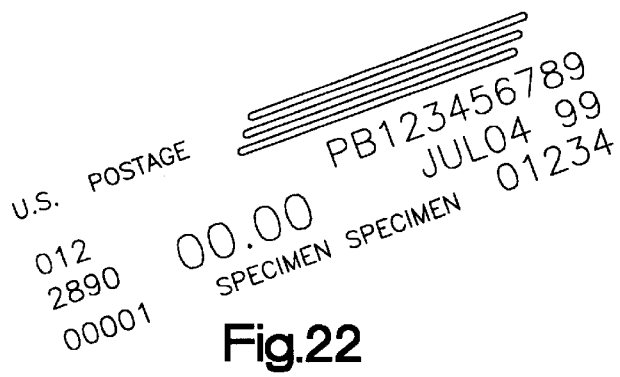
Fig.22
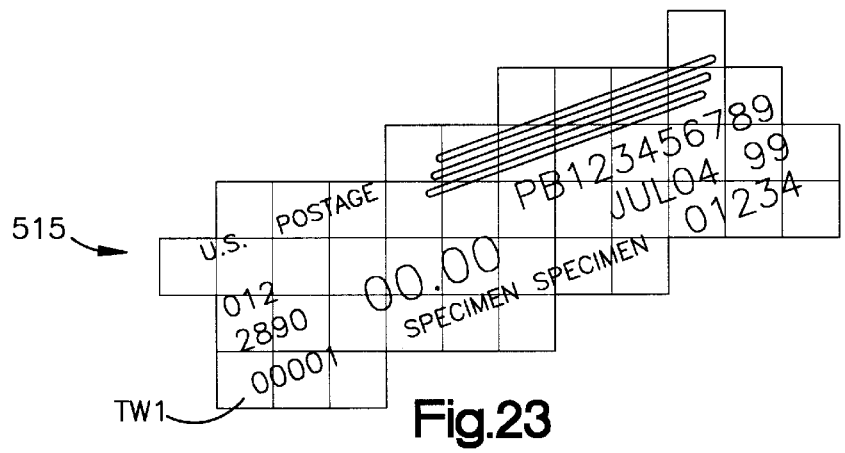
Fig.23
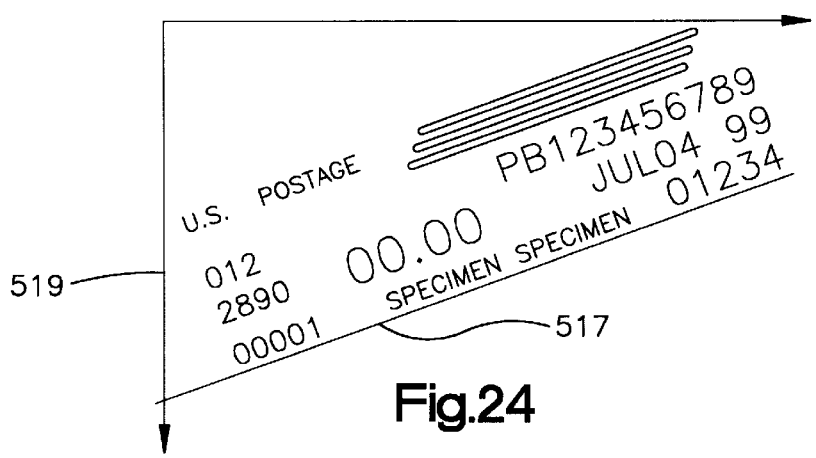
Fig.24
```
U.S.  POSTAGE     ═══════
                  ═══════
012               PB123456789
2890    00.00          JUL04  99
00001     SPECIMEN  SPECIMEN  01234
```
ROTATED BINARY IMAGE
Fig.25

PORTABLE DATA COLLECTION DEVICE HAVING OPTICAL CHARACTER RECOGNITION

FIELD OF THE INVENTION

The present invention relates to a portable dataform reader capable of recognizing characters within an image capture area.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1 D bar code dataforms, that is, bar codes consisting of a single row of contrasting black bars and white spaces of varying widths. Both laser scanners and CCD imaging assemblies are also capable of reading a "stacked" two dimensional (2D) bar code dataforms, such as PDF417, which is comprised of a plurality of adjacent rows of bar code data. The stacked 2D bar code PDF417 includes row indicator patterns utilized by the dataform reader for vertical synchronization to permit reading successive rows of bar code data. A two dimensional (2D) imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in application Ser. No. 08/544,618, which is assigned to the assignee of the present application, includes an imaging assembly having a two dimensional array of photosensors adapted to read 2D bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting image generated with the photosensors are read out after an exposure period or periods. The 2D dataform reader disclosed in application Ser. No. 08/544,618 utilizes an open loop feedback control system including fuzzy logic circuitry to determine proper exposure time and gain parameters for a camera assembly. Application Ser. No. 08/544,618 is incorporated in its entirety herein by reference.

Currently available optical character recognition systems operate in conjunction with fixed station flat bed scanners. A document is placed on the scanner and feed past a scanning head by a document handler. Such systems operate using fixed document illumination, fixed focusing, and a fixed platform for document handling. A fixed station optical character recognition system makes image segmentation, edge detection, and picture binarization easier to perform. Characters read by the scanner are less likely to be distorted and misoriented. Such a scanning system increases the inter-class variance, decreases the interior-class variance and increases the recognition accuracy.

SUMMARY OF THE INVENTION

The present invention relates to non-touch hand-held optical character recognition systems. Such systems provide greater flexibility in use but at a cost of increased character recognition complexity. A hand-held scanner suitable for general optical character recognition must be able to recognize characters anywhere on a document or print media, in any orientation and in a variety of illumination settings.

A portable data collection device constructed in accordance with the present invention includes a housing that defines an internal region and includes a user handle that allows a user to position the housing relative to an indicia carrying target. An imaging assembly includes a two dimensional imaging array supported within the internal region of the portable hand-held housing.

The imaging assembly includes a capture circuit that generates a video signal representative of an image of a target zone. An optics assembly supported by the housing focuses an image of the target area onto the photosensor array. A character recognition processing circuit receives the video signal and categorizes the indicia on the target into a set of predefined characters. The character recognition processing circuit includes a discriminator for identifying a text region of the target and identifying individual character regions within the text region and a categorizer for identifying a character from a set of possible characters for an individual character region. The categorizer performs one or more tests based on pixel data within the individual character region.

A preferred classifier is built in the form of a tree classifier. A number of character feature tests are designed to discriminate between different character shapes. The values for the functional tests for known characaters are tabulated and then used to create thresholds used to evaluate an unknown character. By traversing the tree classifier a given character is identified and then the classifier moves to a next character for recognition. After an entire text region has been determined by classifying the characters the text in ascii form or a similar scheme can be transmitted from the hand held device to a remote location.

From the above it is apparent that one object of the invention is an improved hand-held data gathering device for performing optical character recognition. This an other objects, advantages and features of the invention will become understood from a preferred embodiment of the invention which is described in conjunction with the accompanying drawings.

BRIEF DESCRIPTION OF THE DRAWINGS

FIG. 1 is a perspective view of a portable data collection device of the present invention with a pivoting member of a viewing assembly in a folded down position;

FIG. 2 is a perspective view of the portable data collection device of FIG. 1 with the viewing assembly pivoting member in an upright position.

FIG. 3 is a sectional view of a portion of a housing of the portable data collection device of FIG. 1 and the viewing assembly pivoting member in the upright position;

FIG. 4 is a sectional view of a portion of a housing of the portable data collection device of FIG. 1 and the viewing assembly pivoting member in the folded down position;

FIG. 5 is a view partly in side elevation and partly in section showing use of the viewing assembly to aid in aiming the device;

FIG. 6 is a top view of the portable data collection device of FIG. 1;

FIG. 7 is a front elevation view of the portable data collection device of FIG. 1 as seen from a plane indicated by the line 7—7 in FIG. 6;

FIGS. 17A and 17B depict a flow chart setting forth one operating embodiment of the portable data collection device of the present invention to decode a bar code dataform and capture an image of a target area;

FIG. 18 is a flowchart of the steps performed by the portable data acquisition device in converting text regions of an image into file or a display of text characters;

FIGS. 19A–19S are a series of character depictions that show test functions for classifying characters captured by the portable data collection device;

FIGS. 20A–20C are tabulations for the ten digits of the values derived from the functions described in FIGS. 19A–19S;

FIGS. 22–25 are different depictions of a text region of an image captured by the portable data collection device.

DETAILED DESCRIPTION

Figure 8:
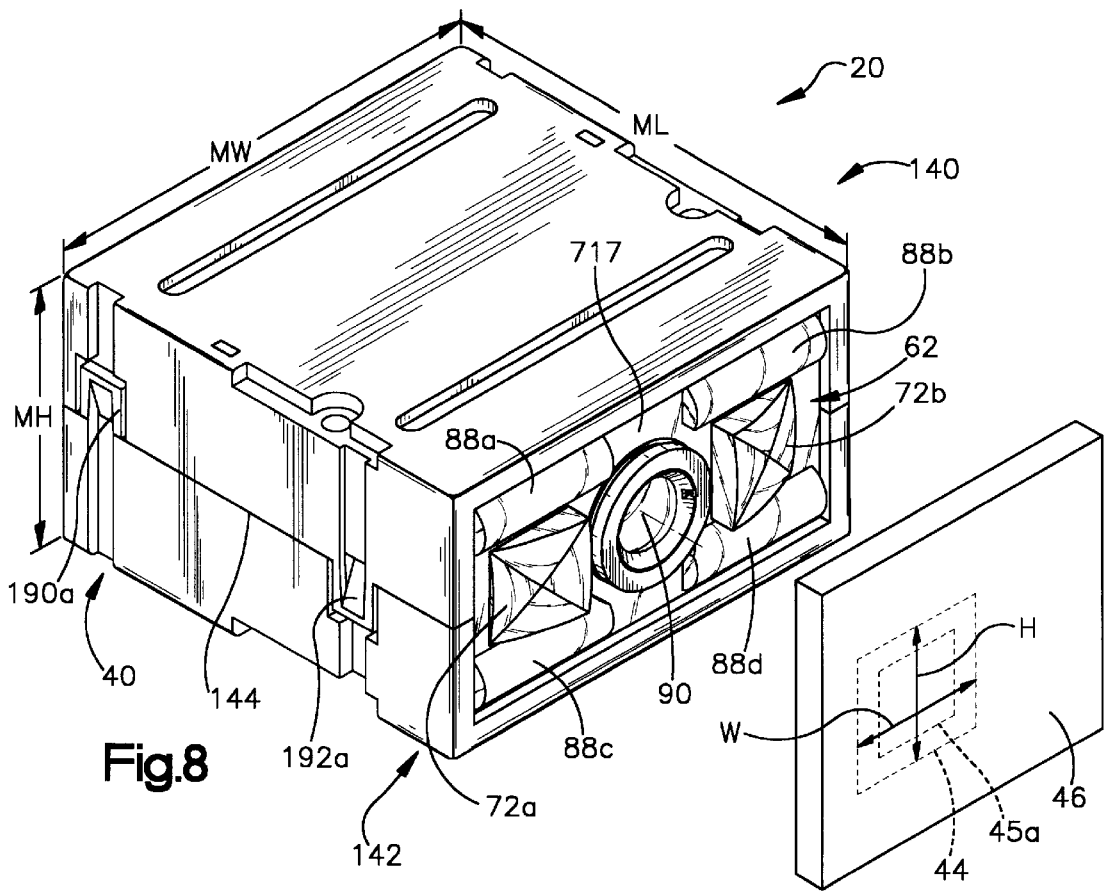
FIG. 8 is a perspective view of a modular camera assembly of an imaging assembly of the portable data collection device of the present invention, the modular portion shown imaging a target dataform affixed to a target item.

Turning to the drawings, a portable data collection device in accordance with the present invention is shown at 10 in FIGS. 1–8. The data collection device 10 includes a housing 12 defining an interior region. The housing 12 includes a gripping portion 14 sized to be grasped in the hand of an operator and enlarged head portion 16 extending from the gripping portion 14. The enlarged head portion 16 includes an opening which exposes one end of a two dimensional (2D) photosensor array imaging assembly 18. The imaging assembly 18 includes a modular camera assembly 20 and a control and decoder board 22 electrically coupled to electronic circuitry of the modular camera assembly. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through a rear opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand.

The gripping portion 14 also includes a small opening that exposes an indicator light emitting diode (LED) 32. The indicator LED 32 displays three different colors. A color green is displayed by the indicator LED 32 when the device 10 is on standby, ready for use. A color orange is displayed with the device 10 has successfully completed an operation such as decoding a target dataform or imaging a target area. A color red is displayed when the device 10 is not ready to perform an operation. Finally, the housing 12 includes an opening exposing a portion of a microphone 34 mounted in the housing interior region and another opening through which a radio antenna 38 extends. A data output port 312 also extend through openings in the gripping portion 14. The output port 312 is a serial data output port. The interior region of the housing 12 supports the imaging assembly 18 and other electronic circuitry to be described below.

Figure 16B:
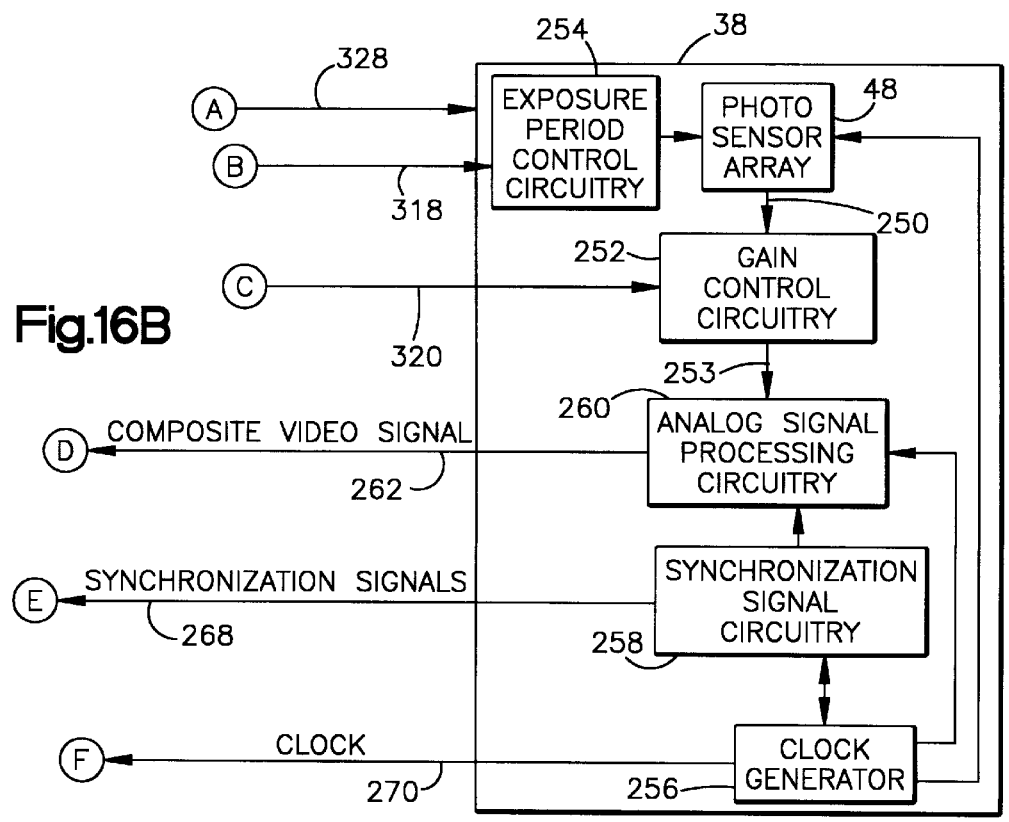
FIG. 16B is a second portion of a block diagram of selected circuitry of the portable data collection device of the present invention, the second portion matching the first portion shown in FIG. 17A.
Figure 9:
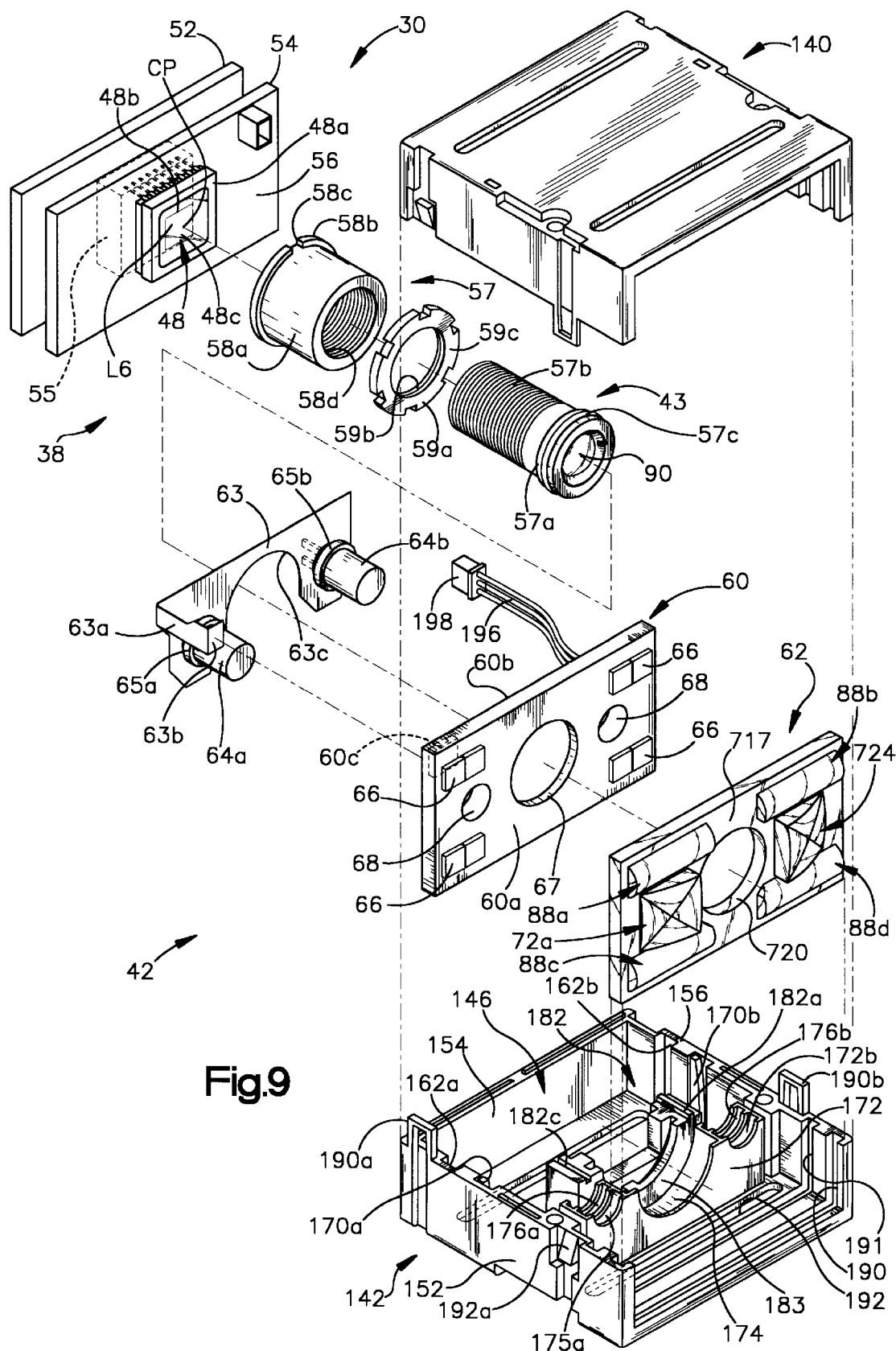
FIG. 9 is an exploded perspective view of the modular camera assembly of FIG. 8.

FIGS. 8 and 9 show perspective and exploded perspective views of the modular camera assembly 20 of the imaging assembly 18, it can be seen that the modular camera assembly 20 includes a housing 40 which supports an illumination assembly 42 and a board camera assembly 38. The board camera assembly 38 includes 48 a color photosensor array mounted on a surface 56 of a printed circuit board 54. The printed circuit board 54 and another printed circuit board 52 support board camera circuitry that, when actuated, generates a composite video signal 262 (FIG. 16B). The modular camera assembly 20 includes an optic assembly 43 which focuses an image of a target area 44 onto a 2D photosensor array 48 (shown schematically in FIG. 14). Specifically, reflected light from the target area 44 is focused by the optic assembly 43 onto an outwardly facing, light receiving surface 48b of the photosensor array 48. The photosensor array 48 is part of a surface mounted integrated circuit (IC) chip 48a.

The photosensor array light receiving surface 48b includes an array of 584 rows by 752 columns of light sensitive photosensors for a total of 439,168 photosensors in the photosensor array. An image of the target area 44 is focused on the light receiving surface 48b. Light incident on a photosensor during an exposure period charges the photosensor. Subsequent to the exposure period, the photosensor charge is read out or discharged. The charge magnitude or voltage read out from a photosensor represents an integration of the intensity of the reflected light focused on the photosensor over the exposure period. Each photosensor of the photosensor array 48 corresponds to a picture element or pixel of a captured image field or frame.

The photosensors of the photosensor array 48 are read out in a frame mode interlaced format which means at a time t1, photosensors in every other row of the photosensor array are read out (e.g., rows 1, 3, 5, . . . , 581) to generate a first captured image field comprising 219,584 image pixels. At a later time t2, photosensors in the other rows are read out (e.g., rows 2, 4, 6, . . ., 582) to generate a second captured image field comprising 219,584 image pixels. The images represented in the first and second captured image fields, when appropriately interlaced row by row fashion comprise a full captured image frame comprising 439,168 image pixels.

The target area 44 is defined by a field of view of the board camera assembly 38 and is represented in FIG. 8 by the dimensions labeled "H" (for height of target area 44) and "W" (for width of the target area 44). The illumination assembly 42 includes four illumination optic portions 88a, 88b, 88c, 88d which project a uniform intensity distribution of illumination across the target area 44. The illumination assembly 42 also includes a targeting arrangement including targeting LEDs 64a, 64b, which, when energized, project illumination through first and second targeting optics 72a, 72b thereby generating a crosshair targeting illumination pattern CR (FIG. 14) to aid in aiming the device 10. To avoid image distortion, the targeting pattern CR is turned off by the imaging assembly 18 when the image frames of the target area 44 are being captured.

The imaging assembly 18 is capable of decoding a target dataform 45 (FIG. 5) affixed to an object 46. The target dataform 45 may be a one dimensional bar code dataform such as Codabar, Code 39, Code 93, Code 128, Interleaved 2 of 5, and UPC/EAN; a two dimensional bar code dataform such as PDF417 and SuperCode; or a matrix dataform such as MaxiCode and DataMatrix. The optic assembly 43 of the present invention is specifically configured to permit reading by the imaging assembly of standard density dataforms having a minimum cell size of 6.6 mils (0.0066 in. or 0.167 mm.). The minimum cell size of a dataform is defined as the smallest dimension of a separately readable information conveying portion of the dataform.

Figure 15:
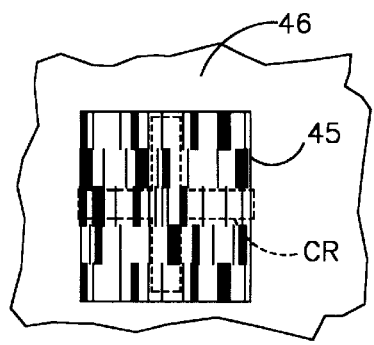
FIG. 15 is a representation of a crosshair illumination pattern generated by the illumination assembly of FIG. 18 superimposed on a target two dimensional bar code dataform.
Figure 15A:
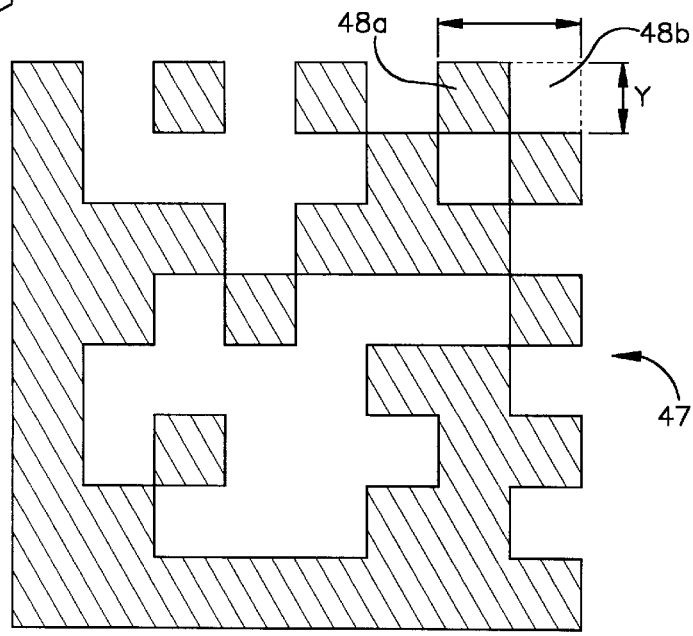
FIG. 15A is an enlarged view of the FIG. 15 representation.

As an example, FIG. 15A shows a DataMatix dataform at 47. (DataMatrix is a binary symbology of International Data Matrix, Inc. of Clearwater, Fla. and is described in U.S. Pat. No. 5,473,151 to Priddy et al.) The two visual squares labeled 48a, 48b, with 48a being a dark block and 48b being a light block labeled may constitute a separately readable information conveying portion of the dataform 47, namely, the letter "B". The cell size of the letter "B" would be the horizontal and vertical dimensions labeled "x" and "y" in FIG. 15A. As can be seen, the vertical dimension "y" is one half the size of the horizontal dimension "x". Thus, the minimum cell size for the letter "B" would be the vertical dimension "y". Additionally, the imaging assembly 18 is capable of capturing an image of the two dimensional target area 44 (FIG. 8).

Modular Camera Assembly Components

Disposed in the interior region 146 of the modular housing 40 are the board camera assembly 38, the illumination assembly 42 and the optic assembly 43. The board camera assembly 38 includes the rear printed circuit board 52 and the front printed circuit board 54. The photosensor array IC chip 48a is disposed on the front surface 56 (FIG. 9) of the front printed circuit board 54. The light receiving surface 48b of the photosensor array 48 receives reflected illumination from the target area 44 focused through the optic assembly 43. The light receiving surface 48b of the photosensor array 48 is overlaid by the filter 48c. The illumination assembly 42 includes a printed circuit board 60, a lens array 62 and two targeting LEDs 64a, 64b. The lens array 62 functions as the outer or front panel of the modular camera assembly 20. The term "front panel" will be used interchangeably with the term "lens array" throughout. A plurality of exposure LEDs 66 are disposed on the front surface of printed circuit board 60 to direct illumination through the lens array 62 towards the target area 44. The flexible printed circuit board 63, which route power to the targeting LEDs 64a, 64b, is also electrically coupled to the circuit board 60. The flexible printed circuit board 63 has a central unshaped cut out region 63c to provide clearance for the outer shroud 58a of the shroud assembly 57. The targeting LEDs 64a, 64b, when energized, project targeting illumination through openings 68 in the circuit board 60 and through targeting optics of the lens array 62 to form the crosshairs light or illumination pattern CR which aids in aiming the device 10 at the target dataform 45 or target object 46.

Optic Assembly 43

Figure 10:
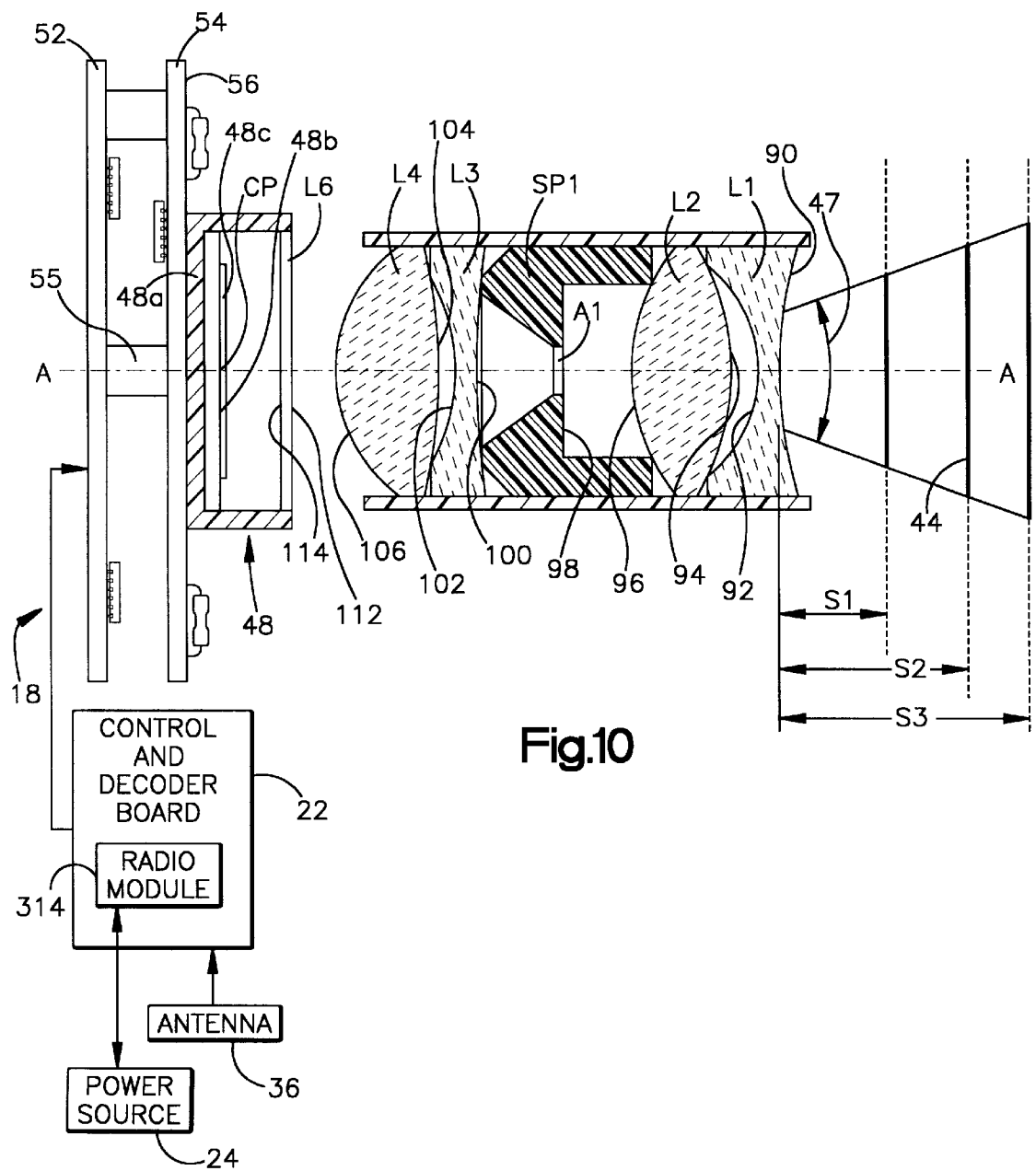
FIG. 10 is a schematic representation of a plurality of lens of an optic assembly of the modular camera assembly.

FIG. 10 shows a cross section of the camera assembly 38 with the optic assembly 43 focusing an image of the target area 44 onto the photosensor array 48. The performance of the portable data collection device 10 is enhanced by the optic assembly 43 which enables imaging and decoding of dataforms with a minimum cell size of 6.6 mil (0.168 mm.). The optic assembly 43 includes a shroud assembly 57 (FIG. 11) and a lens assembly LA (FIG. 10). The lens assembly LA includes lenses L1, L2, L3, L4 and a spacer member SP1 with a small central aperture A1 (1.17 mm. in diameter) all supported within an inner cylindrical shroud 57a (best seen in FIG. 9). The lens assembly LA also includes a lens L5 which is supported by an upper surface of the photosensor array IC chip 48a. Thus, there are eleven optic surfaces (including the portion of the spacer member SP1 defining the aperture A1) labeled 90, 92, 94, 96, 98, 100, 102, 104, 106, 108, 110 in FIG. 10. The shroud assembly 57 also includes a lock nut 59a and the outer shroud 58a. The lock nut 59a includes internal threads 59b which thread onto external threads 57b of the inner shroud 57a. When the lock nut 59a is properly positioned on inner shroud threads 57b, the inner shroud 57a is threaded into internal threads 58d of the outer shroud 58a. When assembled, the forward facing surface 59c of lock nut abuts a back surface 60b of the printed circuit board 60. The outer shroud 58a is securely held in place by a support 182 (FIG. 9) of the upper and lower housing portions 140, 142 thereby insuring a proper perpendicular angle relationship between an optical axis through the optic centers of each of the lenses L1, L2, L3, L4 and the outward facing, light receiving surface 48b of the photosensor array 48.

Additionally, the lock nut 59a facilitates precise positioning of the lenses L1, L2, L3, L4 of the lens assembly LA with respect to the longitudinal displacement of the lenses along an optical axis labeled A—A in FIG. 10. The precise positioning of the lenses L1, L2, L3, L4, L5 with respect to the photosensor array 48 permits the sharpest possible image of the target dataform 45 to be directed on the center point CP of the light receiving surface 48b of the photosensor array 48. As can best be seen in FIG. 11, an O-ring 57c is disposed in a annular groove in the outer surface of the inner shroud 57a. The O-ring 57c seals against a central opening 61 of the lens array 62 to prevent external contaminants from entering the interior region 146 of the modular housing 140.

Figure 11:
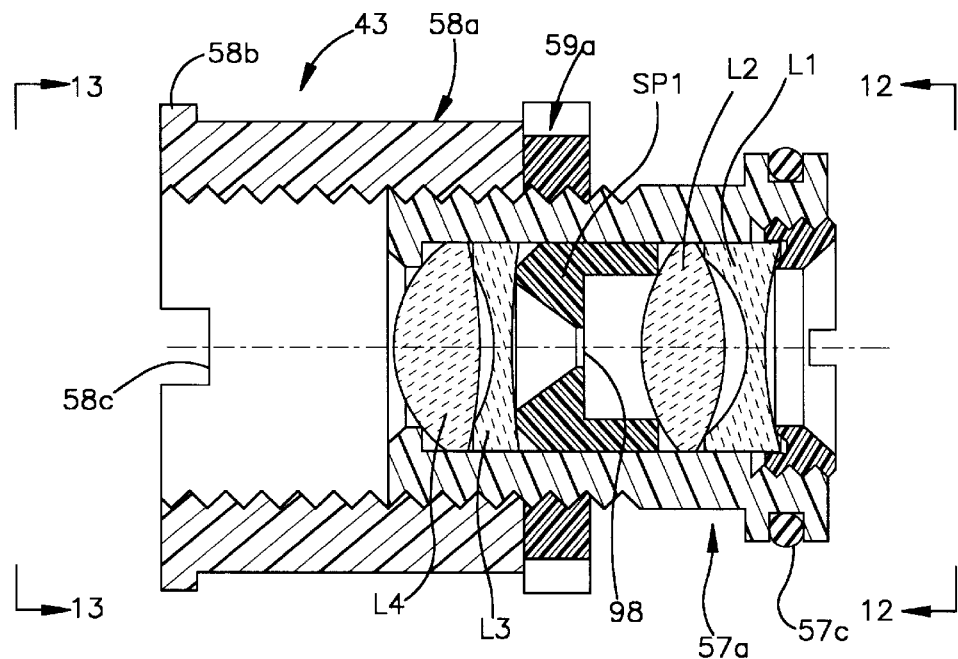
FIG. 11 is a view, partially in side elevation and partially in section of the optic assembly of the modular camera assembly.
Figure 12:
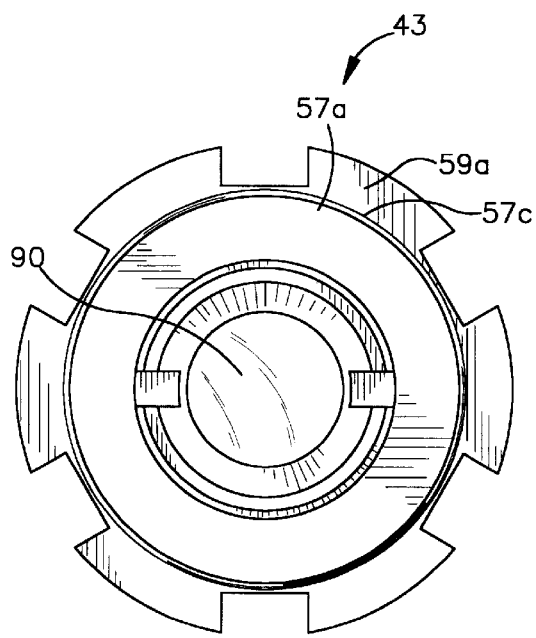
FIG. 12 is a front elevation view of the optic assembly of the modular camera assembly as seen from a plane indicated by the line 12—12 in FIG. 11.
Figure 13:
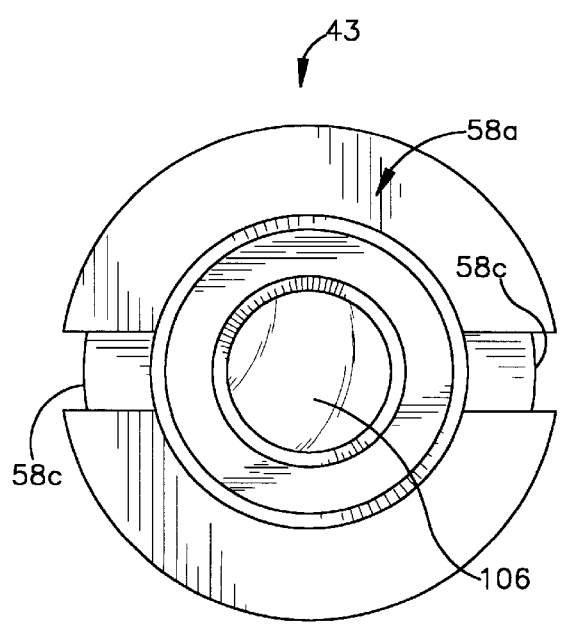
FIG. 13 is a rear elevation view of the optic assembly of the modular camera assembly as seen from a plane indicated by the line 13—13 in FIG. 11.

Turning to FIG. 11, based on the distance between the optic assembly 43 and the photosensor array 48, for a given dataform minimum cell size or dimension, there exists a best focus position S2 in front of the forward-most surface 90 of the lens L1 of the optic assembly 43 at which an image of the target dataform 45 in the target area 44 will be focused sharpest on a center point CP of the light receiving surface 48b of the photosensor array 48. The image sharpness gradually degrades as the target dataform 45 is moved from the best focus position inwardly towards a near field cut off distance S1 or away toward a far field cut off distance S3. At the near field and far field cut off distances S1, S3, the target dataform 45 having the specified minimum cell size is still capable of being decoded. However, at distances less than S1 or greater than S3, the imaging assembly 18 will no longer be able to decode the target dataform 45.

The horizontal and vertical angular field of view of optic assembly 43 is 32° (horizontal)×24° (vertical). This corresponds to a 40° diagonal field of view. The horizontal angular field of view is shown schematically as an angle labeled with reference number 47 in FIG. 14. Near field and far field cut off distances S1 and S3 are set forth below for a number of different dataform minimum cell sizes. At the S1 and S3 distances, a dataform having the specified minimum cell size can still be decoded by the imaging assembly 18. For a minimum cell size of 15 mil, the S2 best focus working distance is 140 mm. (5.5 in.).

The preferred optic assembly 43 includes four lenses L1, L2, L3, L4 and the plastic spacer member SP1 separating lenses L2 and L3. The lenses L1, L2, L3, L4 and the spacer member SP1 are supported in the inner shroud 57a of the shroud assembly 57. A flat lens L5 is mounted on an upper surface of the photosensor array IC chip 48a and overlies the light receiving surface 48b of the photosensor array 48.

Illumination Assembly 42

Because the desired working range and field of view of the portable data collection device 10 dictates that the optic assembly 43 have a large F number (F #9), the illumination assembly 42 must provide adequate illumination of the target area 44 during the exposure period so that enough reflected light is absorbed by the photosensor array 48 to generate a suitably bright image. However, the exposure period is normally limited to 0.01 seconds or less to minimize the smear effect of an operator's hand jittering during a dataform reading session. Therefore, the illumination assembly 42 must provide adequate illumination to accommodate the large F# and short exposure time.

The printed circuit board assembly 60 includes a plurality of surface mount exposure illumination LEDs 66. A single piece acrylic or polycarbonate lens array 62, preferably fabricated of PMMA (polymethyl methacrylate), is positioned between the printed circuit board assembly 60 and the target area 44 (FIGS. 8 and 9) for directing the illumination from the exposure LEDs 66 towards the target area 44.

The illumination LEDs 66, which are set out in four banks of four LEDs, emit a red color light to illuminate the target area 44. Suitable red surface mount LEDs are available as Part No. MTSM735K-UR or MTSM745KA-UR from MarkTech Corporation of Latham, N.Y.

As can be seen in FIG. 10 with respect to the previously described lens array 62, the lens array 62 functions as a front panel for the modular portion 20 of the imaging assembly. The printed circuit board assembly 60 includes printed conductors and conductive leads 196 including a power lead operative for supplying power to the illumination LEDs 66. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totaling sixteen illumination LEDs providing at least 4560 mcd of uniform illumination over the target area 44 at the best focus distance S2. A central opening 67 in the printed circuit board assembly 60 provides an opening for the shroud assembly 58 to extend through.

The illumination optic portions 88a, 88b, 88c, 88d direct a 68 degree angular illumination field from each illumination LED 66 into a uniform field having an angular field of view horizontally and vertically which substantially corresponds to the angular field of view horizontally and vertically of the optic assembly 43 which defines the target area 44.

The targeting LEDs 64a, 64b are turned off by the imaging assembly circuitry 18 during capture of an image frame to reduce possible image distortion caused by glare from the targeting LEDs reflecting off the target object 46. In an alternate embodiment, in addition to turning off the targeting LEDs 64a, 64b, the four banks of illumination LEDs 66 may be sequentially energized instead of being simultaneously energized to further reduce glare from the target object 46 in the target area 44 of the optic assembly 43. That is at any given point in time, only one bank of illumination LEDs would be energized. After a short predetermined time period, the presently energized bank would be turned off and another bank would be energized for the predetermined time period. In this manner each bank would be energized sequentially, being energized ¼ of the time and off ¾ of the time. Sequential illumination of the four banks of two illumination LEDs 66 will have the effect of reducing the overall level of illumination of the target area 44 while still providing for uniformity in illumination throughout the target area.

In other operating embodiments, the sequence of energization may be varied so that at any point in time more than one LED bank is energized, for example, sequencing of energization of the LED banks could be altered such that two or three banks of LEDs are energized at any given point in time.

Image Processing of the Imaging Assembly 18

Figure 16A:
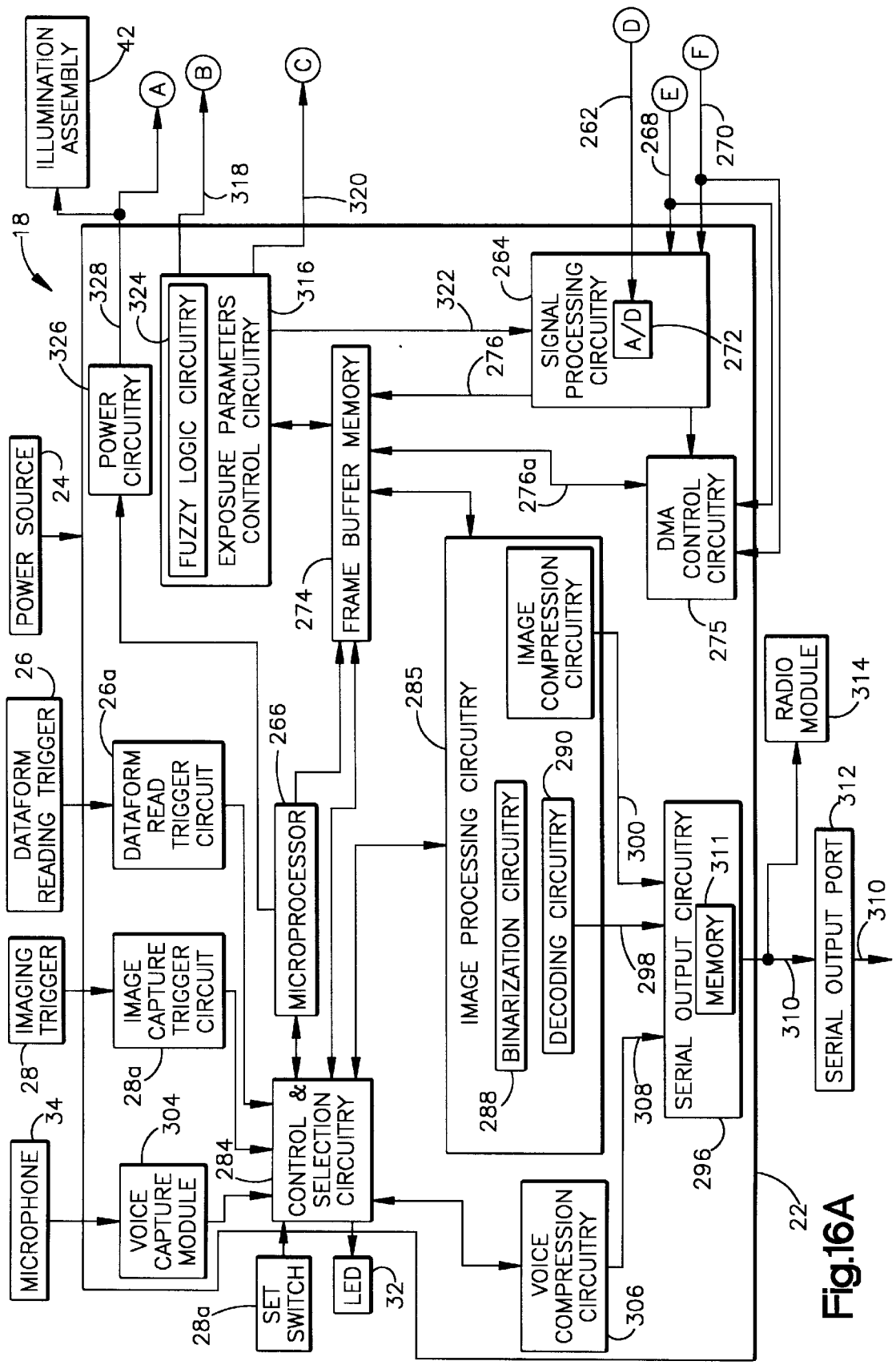
FIG. 16A is one portion of a block diagram of selected circuitry of the portable data collection device of the present invention.

In the preferred embodiment of the portable data collection device of the present invention, the color 2D photosensor array 48 is part of the board camera assembly 38 and is commercially available from such Sony of Japan. Referring to FIGS. 16A and 16B, the board camera assembly 38, when activated in either the dataform reading or imaging mode, generates a composite video signal 262. As can be seen schematically in FIG. 16B, the board camera assembly 38 includes a clock generator 256, synchronization signal circuitry 258 and analog signal processing circuitry 260 for reading illumination intensity values out of each photosensor of the photosensor array 48 and generating the composite video signal 262.

The intensity of light incident on individual photosensors of the photosensor array 48 varies somewhat uniformly from very bright (whitest areas of the image of the target area 44) to very dark (darkest areas of the image of the target area 44). The preferred photosensor array 48 comprises an interlaced 752 by 582 matrix array of photodiode photosensors that define a total of 437,664 pixels. The clock generator 256 is coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 250 (FIG. 16B) wherein temporal portions of the voltage signal represent the charges accumulated on each photosensor. One CCD element is provided for reading out the charges on two photosensors thus two read outs of the photosensor array 48 comprise one full image frame, the image frame being comprised of two interlaced fields.

The board camera assembly 38 generates the composite analog video signal 262 corresponding to consecutive fields of the image incident on the photosensor array 48. The video signal 262 is termed "composite" because it includes synchronization signals generated by the synchronization signal circuitry 258 which correlate portions of the video signal to particular photosensor locations, interspersed among image signal portions wherein the signal magnitude represents charges on individual photosensors read out from a given row of the photosensor array 48.

The board camera assembly 38 also includes gain control circuitry 252 for controlling amplification of an image signal 253 and exposure period control circuitry 254 for controlling a duration of an exposure period of the photosensors. Both the exposure period control circuitry 254 and the gain control circuitry 252 are controlled by fuzzy logic exposure parameter control circuitry.

The synchronization signals 268 generated by synchronization signal circuitry 258, the clock signal 270 generated by the clock generator 256, and the composite video signal 262 are output to signal processing circuitry 264 on a control and decoder board 22. Under the control of a microprocessor 266 mounted on the control and decoder board 22, the composite video signal 262 is input to the signal processing circuitry 264 along with the clocking signals 268 and the synchronization signals 270. The signal processing circuitry 264 includes synchronization extractor circuitry which receives the clocking signals 268 and the synchronization signals 270 and generates signals which are coupled to analog to digital converter circuitry (A/D converter circuitry) 272 causing the A/D converter circuitry to periodically digitize the video signal 262. The A/D converter circuitry 272 includes an A/D converter generating an 8 bit gray scale value for each photosensor read out. The 8 bit gray scale illumination value corresponding to a given photosensor is a surrogate measure of the illumination incident on the photosensor over the exposure period prior to the reading out of the photosensor. The magnitude of gray values ranges from 0 (low charge read out from photosensor corresponding to a low illumination level incident on photosensor over the exposure period) to 127 (high charge read out from photosensor corresponding to a high illumination level incident on photosensor over the exposure period).

Direct memory access (DMA) control circuitry 275 receives the synchronization signals 270 and clock signals 268 and generates address signals 276*a* coupled to a frame buffer memory 274 to indicate a storage location for each value generated by the A/D converter circuitry 272. Data signals 276 representing the gray scale values generated by the A/D converter circuitry 272 are coupled to the frame buffer memory 274.

Control and selection circuitry 284 mounted on the control and decoder board 22 and coupled to the frame buffer memory 274 receives successive image frames temporarily stored in the frame buffer memory 274. Also coupled to the control and selection circuitry 284 are the dataform read trigger circuit 26*a* which, in turn, is coupled to the dataform reading trigger 26 and an image capture trigger circuit 28*a* which, in turn, is coupled to the imaging trigger 28.

Dataform Reading Mode

When an operator institutes a dataform reading session (dataform reading mode) by depressing the dataform reading trigger 26, the dataform read trigger circuit 26*a* sends a signal to the control and selection circuitry 284 causing the control and selection circuitry to control operation of an image processing circuit 285. The image processing circuit 285 performs steps outlined below and it is appreciated that many of these steps could also be performed directly by the microprocessor 266.

The image processing circuitry 285 includes binarization circuitry 288 and image processing and decoder circuitry 290 to adjust the magnitudes of selected gray scale values stored in the frame buffer memory 274 and decode the adjusted selected gray scale values.

Imaging Mode for Optical Character Recognition

When an operator institutes an imaging session (imaging mode) by depressing the imaging trigger 28, the image capture trigger circuit 28*a* captures an image. To perform optical character recognition, the control and selection circuitry 284 causes the selection circuitry to identify text regions and actuate a binarization circuit 289 that converts the gray scale values corresponding to a captured image into binarized digital data and stores the binarized data back into the memory 274.

The binarized digital data for each character is an array of pixels surrounded by white space. This data (including the bounding white space pixels) is extracted from the frame buffer memory 274 and evaluated to determine what character those pixels represent. The character is typically chosen from a set of characters such as the ascii character set. The character data 300 is processed by serial output circuitry 296 and made available as a serial stream of data 310 through the serial output port 312 and/or a radio module 314. Note, the optical character recognition that is provided compresses many pixels in an array into a single ascii byte and therefore no data compression is needed.

If, however, a high resolution image is needed, for example when the image is not used for character recognition, the control and selection circuitry 284 may be appropriately programmed to route the data (either compressed or uncompressed) representing the captured frame directly to the serial output circuitry 296 and the radio module 314.

Voice Data Capture

The portable data collection device 10 is also capable of capturing a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signal. Data 308 representing the compressed digitized voice signal is coupled to the serial output circuitry 296.

Decoded data 298 (from either a dataform or decoded character data), compressed image data 300 and compressed digitized voice data 308 are routed to the serial output circuitry 296 which assembles output data 310 for serial output through the serial output port 312 or the radio module 314. In portable data collection device 10, the serial output port 312 is coupled to an input port of a radio module 314 mounted on the control and decoder board 22 (shown schematically in FIG. 14). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc.

Exposure Control

The control and decoder board 22 further includes exposure parameters control circuitry 316 which outputs control signals 318, 320 to the exposure period control circuitry 254 and the gain control circuitry 252 of the camera assembly 38 and a signal 322 embodying an appropriate set of reference voltages for operating the A/D converter 272 within the signal processing circuit 264. The exposure parameters control circuitry 316 includes fuzzy logic circuitry 334 which analyzes captured frames of data accessed from the frame buffer memory 274. The fuzzy logic circuitry 324 analyzes a captured frame to determines if the current exposure period of the 2D photosensor array 48, the current amplification of the video signal 250 by the gain control circuitry 252 and the reference voltages used by the A/D converter circuitry 272 are resulting in an "acceptable" captured image frame. If not, the control signal 318 is changed to adjust the exposure period of the 2D photosensor array 48 and/or the control signal 320 is changed to adjust the amplification of the video signal 250 and/or the signal 322 is changed to adjust the operation of the A/D converter circuitry 272. After the adjustment, another captured frame is analyzed by the fuzzy logic circuitry 324 and, if necessary, further adjustments are made in an iterative fashion until the camera assembly 38 produces an "acceptable" captured image. A suitable exposure parameter control circuit including fuzzy logic control circuitry is disclosed in U.S. patent application Ser. No. 08/544,618, filed Oct. 18, 1995, entitled "Extended Working Range Dataform Reader Including Fuzzy Logic Image Control Circuitry." The contents of U.S. Ser. No. 08/544,618 are incorporated in its entirety by reference.

Figure 14:
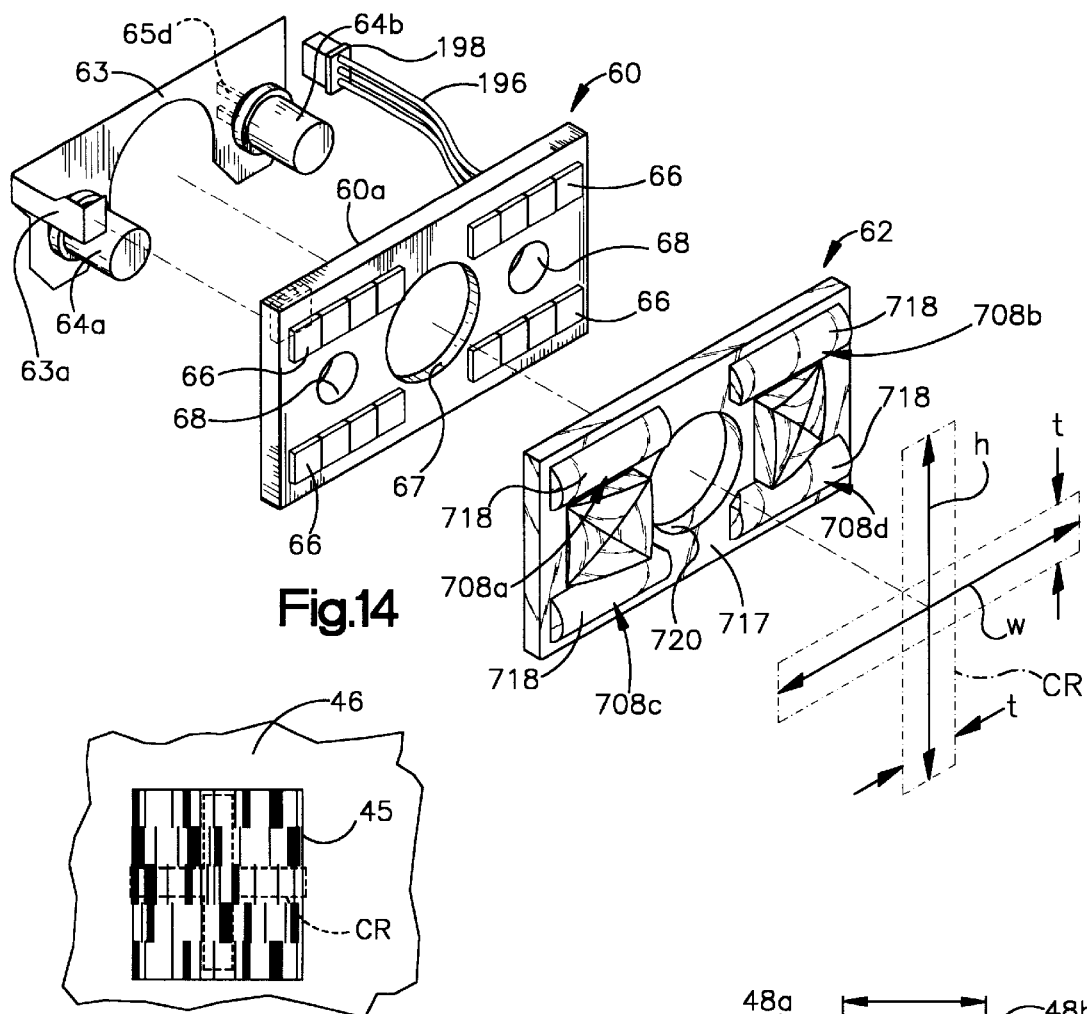
FIG. 14 is an exploded perspective view of an illumination assembly of the modular camera assembly of the imaging assembly of the present invention.

As can be seen in FIGS. 14 and 16A, the power source 24 is coupled to the control and decoder board 22 to provide operating power to the microprocessor 266 and other circuitry mounted on the board and the radio module 314. Power circuitry 336 under the control of the microprocessor 266 is coupled through a lead 338 to the illumination assembly 42 and the board camera assembly 38 to supply power to these components of the imaging assembly 18.

Operation of Imaging Assembly 18 in Dataform Reading and Imaging Modes

Figure 17A:
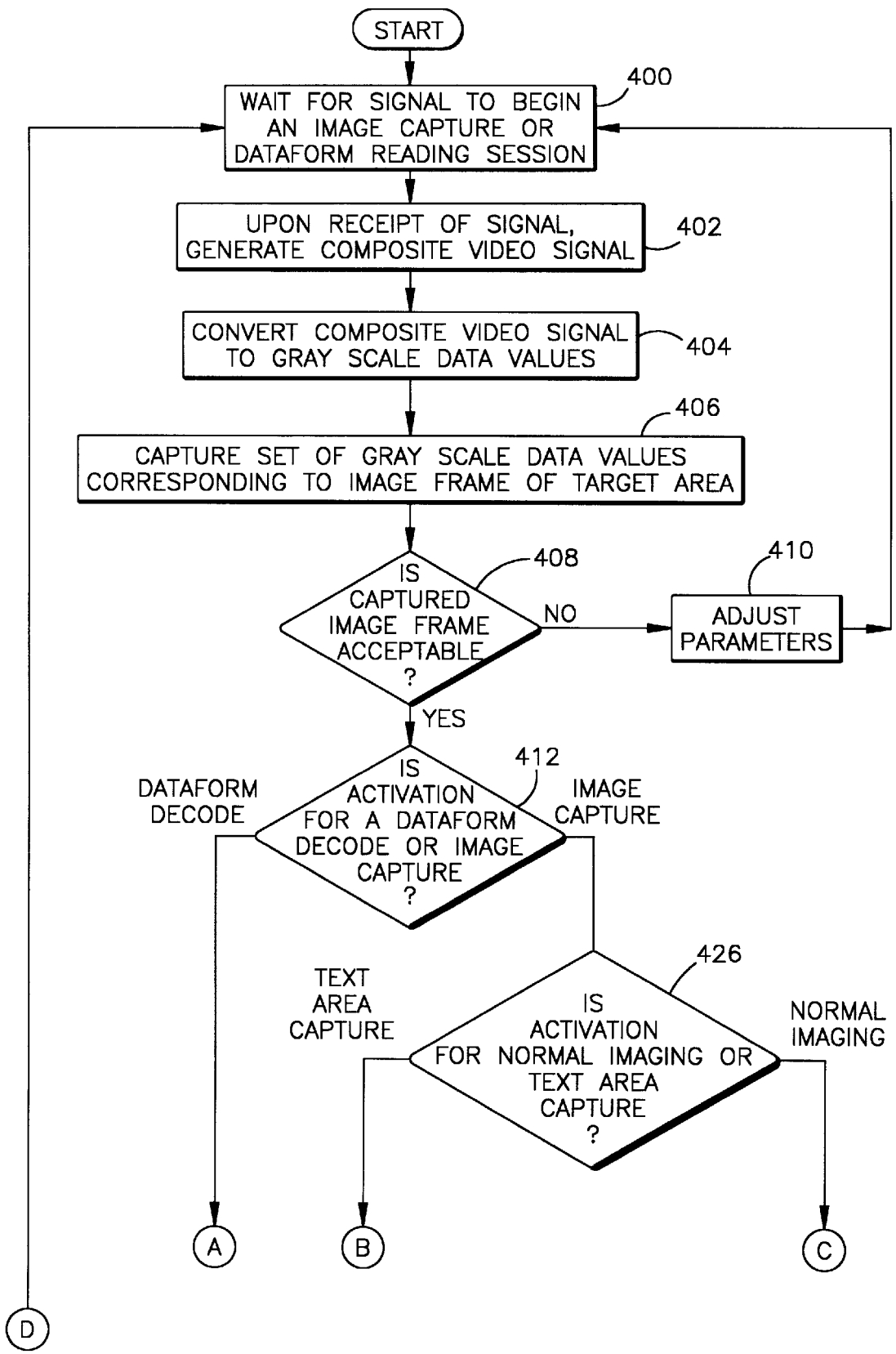

The flow chart shown in FIGS. 17A and 17B illustrates the operation of the imaging assembly 18 in a dataform decoding mode and an imaging mode. In the first operating embodiment of the imaging mode, a single frame of the image in the target area 44 is captured, compressed and output when the operator depressed the imaging trigger 28. The flow chart shown in FIG. 32 illustrates the operation of the imaging assembly 18 in the dataform decoding mode and in an imaging mode.

Turning to the flow chart of FIGS. 17A and 17B, at a step 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. Upon receiving an appropriate signal, a composite video signal is generated 402, converted to a grey scale image 404 and stored 406 in the frame buffer memory 274.

At a step 408, the fuzzy logic circuitry 334 determines if the captured image frame is acceptable, that is, the image is within predetermined acceptable ranges for brightness and the magnitude of charges on the photosensors of the 2D photosensor array 48. If the fuzzy logic circuitry 334 determines the captured frame is not acceptable, one or more of the operating parameters of the board camera assembly 38 and the A/D converter circuitry 272 are modified as shown at step 410 and the steps 400, 402, and 404 are repeated.

At step 412 the control and selection circuitry 284 determines whether the dataform or image capture input has been activated. If the activation signal is from the dataform reading trigger 26 requiring a dataform decode, at step 414 the gray scale values representing the imaged dataform in the target area 44 are binarized and a dataform image area is identified. The image processing and decoder circuitry 285 reconstructs the image of the dataform via cell extraction 416 and the decoding 418 of the dataform image. At step 420, a determination is made if the decoding was successful. If the decoding was successful, the extracted decoded data is output 422 to the serial output circuitry 296 and at step 424, the orange color of the LED indicator 32 is energized for a predetermined time to signal the operator that the dataform 45 in the target area 44 has been successfully read. Subsequently, the imaging assembly 18 is turned off. If at step 420, the decoding was not successful, the process returns to capture another image. The user knows that another image capture is needed since he or she is not given the feedback of the orange color LED indicator.

If at step 408, the control and selection circuitry 284 determines that the activation signal is from the imaging trigger 28, at step 426 a determination is made whether the activation is for normal imaging or optical character recognition. If optical character recognition is required, the image is binarized and a character region is identified 428. The optical character recognition is performed 430 and the data is output 432. If full image capture and transmission is needed the image is either binarized and compressed or merely compressed and transmitted. In either event, the LED indicator 32 is energized 424 to display the color orange to signal the operator that the image in the target area 44 has been successfully captured.

As can best be seen in FIGS. 16A and 16B, the imaging assembly 18 includes the camera board assembly 38 of the modular camera assembly 20 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 5) mounted on the control and decoder board 22 and operated by the microprocessor 266. Alternately, the circuitry of the imaging assembly 18 may comprise separate application-specific integrated circuitry (ASIC) mounted on the control and decoder board 22.

Text Extraction and Decoding

In order to extract the text from an image that has been imaged by the portable data collection device 10, certain requirements must be met. The text must be located in a central position of a captured image and there should be blank or white space surrounding all the text. A number of processes are performed to provide text area zoning, binarization, rotation and feature selection as well as the actual optical character recognition. The flow chart of FIG. 18 provides an overview of the process.

During a text area zoning step 510 an image is received which is a grey scale image. In this image, a text area in which all characters to be determined by OCR techniques is a key area for consideration. For optical character recognition, background regions and regions with graphics are unnecessary areas which are excluded from consideration.

To extract the regions of text, the image is broken up into i rows and j columns of windows. If the size of the windows in pixels is NX*NY, then each window has a size of (NX/I)*(NY/j). One can designate a window by W[p][q] where p=1,2, . . . I; q=1,2, . . . , j. The process will detect all windows that may contain text.

A text threshold is computed from a histogram of all values of windows contrast.

Contrast=C[p][q]=Max[p][q]−Min[p][q]; where p=1,2, ..., I; q=1,2. ..., j.
  Max[p][q]=maximum {g[i][j]: (i,j) within W[p][q]}
  Min[p][q]=minimum {g[i][j]; (i,j) within W[p][q]} where g[i][j] are pixels from the original greyscale image. For windows where the contrast C[p][q] is greater than or equal to a threshold PA the window is a candidate for text and where the contrast C[p][q] is less than the threshold PA the window is not a candidate for text.

Each of the windows that partition the text image is next binarized 512, i.e. the greyscale of the text windows is converted to either one of two values, black or white. Binarization of the grey scale image is implemented in both the text and non-text windows and the non-text windows are all set to white. A text window set TW is defined to be the set of all text windows.

An adaptive threshold technique is used during the binarization step 512. An array is defined based on the greyscale content of the windows in the text window set.
  Th[p][q]=(Max[p][q]+Min[p][q])/2; If(p,q) is within TW.
  Th[p][q]=0; If(p,q) is not within TW.

The Max and Min values are the greyscale maximum and minimum values for a given window. Once the threshold is determined for a given window, all pixels for a given window are binarized. A pixel is black if its greyscan value is greater than the threshold and it is white if it is less than or equal to the threshold. The result of this binarization is shown in FIG. 22.

As seen in FIG. 22, the text derived from the image can be orientated at an angle based on the orientation at which the hand held data capture device 10 is held. A text rotation step 514 is implemented for the set TW of text windows. To begin the process an estimation is performed of the orientation of the text. FIG. 23 shows the binary text area 515 and the set of text windows TW that make up this area. A lowest boundary of text is determined and a subset of TW referred to as LBW (for lowest bound window) is generated. For each window in the set LBW the co-ordinates of the lowest black pixel (extrema) are determined. Assume for example window (1,1) was part of the set LBW. Then the extreme or lowest point for that window is designated as the co-ordinate (EI1,EJ1). A set of such coordinates is generated for the LBW windows. A line 517 that intersects these co-ordinates EI, EJ is indicated in FIG. 24.

A least Square Estimation of text orientation is performed based upon the identified Extrema. Define two variables EA and EB as follows.

$$EA = \frac{\sum EIi * EJi - (\sum EIi)(\sum EJi)}{n * \sum EJi * EJi - (\sum EJi) * (\sum EJi)}$$

$$EB = \frac{(\sum EIi)(\sum EJi * EJi) - (\sum EIi * EJi)(\sum EJi)}{n * \sum EJi * EJi - (\sum EJi) * (\sum EJi)}$$

Each of the summations is from i=1 to n where n are the number of windows in the lower boundary window subset LBW. EA is an estimation of the slope of the line 517 connecting the EI, EJ points in FIG. 24 and EB is the intercept estimation with the y co-ordinate axis 519. This information is sufficient to reorient the TW windows and store the reoriented data as is depicted in FIG. 25.

Once the text is reoriented, individual characters are segmented at a step 520 from the text windows. Character segmentation is performed by examining an upper left hand corner of the text region and examining pixels (that have been binarized) to find a white border around a region of black pixels. In order to make sense to a reader the text must consist of dark pixels that make up the character bounded by whitespace of at least a minimal width. Once a character has been segmented it is recognized 522 and stored 524.

FIGS. 19A–19S depict a sequence of functional tests that are performed on character identified regions. The tests are performed on any array of binarized pixels of any width and height (in pixels). The character "6" is chosen for uniformity in illustration and the height and width in pixels is chosen to be small to make the illustration easier. In practice a character would be depicted using more than the number of pixels shown in FIGS. 19A–19S.

In FIGS. 19A–19S each character depiction has been identified with a function. As an example, the FIG. 19A depiction is identified as functional test f(0) and is assigned a value of 6/4 or 1.5. The value 6/4 is derived from a scan of the pixel rows that make up the character. Each of the functional tests is summarized below.

Figure 21:
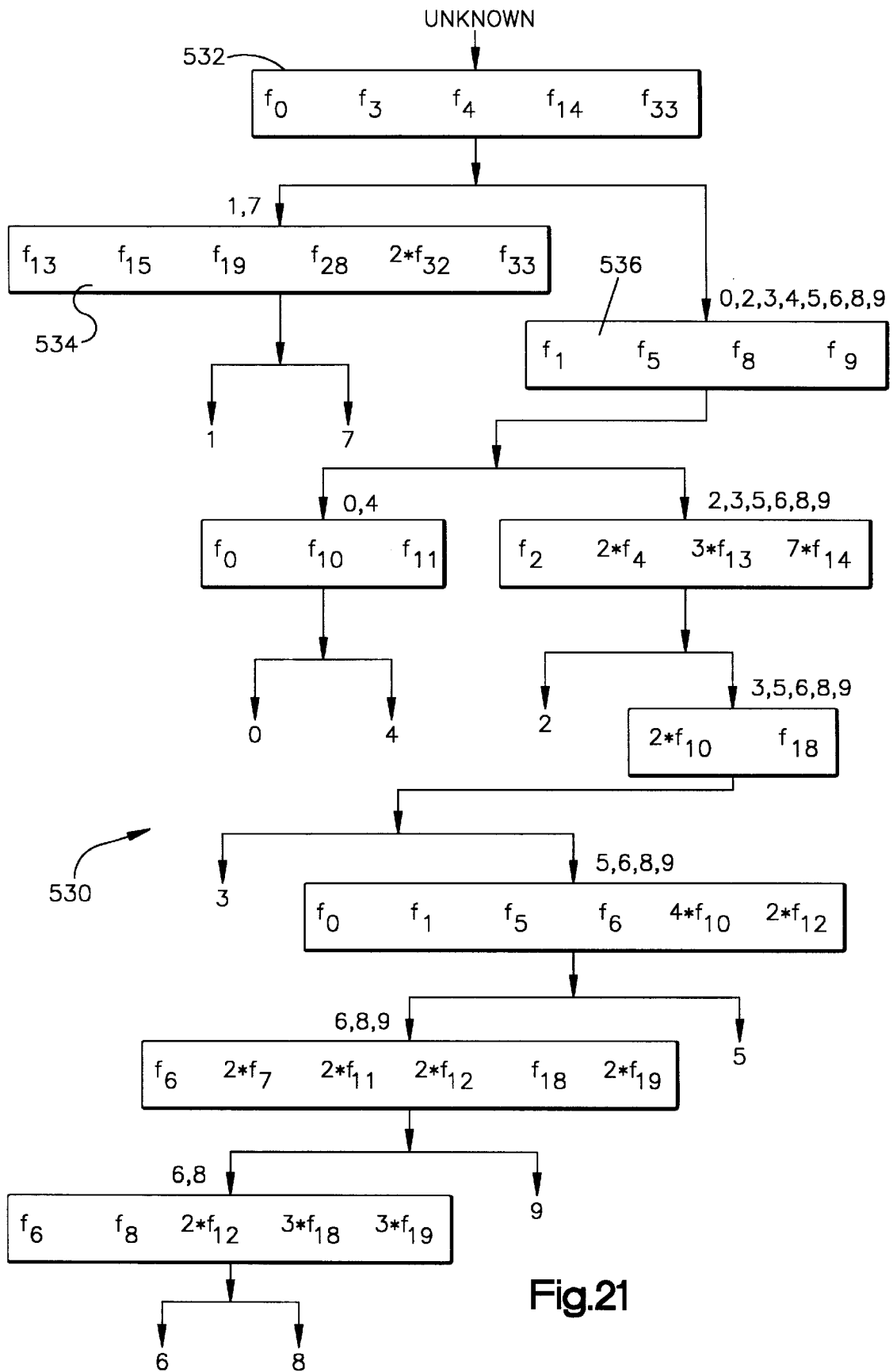
FIG. 21 is a flowchart of a tree classifier for determining a character based upon the results of the tests performed by the depictions of FIGS. 19A–19S.

FIG. 21 is a depiction of a tree classifier 530 for digits in the range of 0–9. A similar classification scheme is used for letters of the alphabet. In the classifier a first decision step 532 is used to begin a traversal of the tree. This decision is based upon five functional tests that are designated f(0), f(3), f(4), f(14), and f(33).

The test f(0) (FIG. 19A) is performed by beginning at a right edge of the character occupied region and scanning across each row while keeping track of transitions from white space pixels to black pixels. In a first row 540 a first transition occurs at point between two pixels 542, 544. In the third row 550 two transitions occur, one at an interface between the two pixels 552, 554 and a second between the two pixels 556, 558. Once the entire character has been scanned in this manner, a sum for the character is determined. In the illustrated example this sum is '9' and is calculated from the sum of transitions for the rows that include black pixels.

A next step is performed by scanning the character as follows: when scanning lines pass through the boundaries of the character, always assign a one '1' value regardless of the number of intersections with black pixels that are encountered. The result of this second tabulation is the number '6' and is depicted to the right in FIG. 19A. The result for the functional test f(0) is determined as the quotient of these two determinations. Although a small number of pixels are shown for representation purposes, an actual image would include more pixels for the character. A similar test to the test of FIG. 19A is performed for the character depicted in FIGS. 19B, 19C, and 19D except that the scan direction is changed.

The test of FIG. 19E is also performed by scanning across the character but the character is first partitioned through its center and only the data from the top half is evaluated for transitions from white to black. Again, a sum is determined, the two sums are 4 and 3 respectively and f(6)=4/3 or 1.33. The tests of FIGS. 19F, 19G, and 19H also involve partitioning and scanning of the character as captured by the imaging.

The test of f(10), f(11), f(12) and f(13) depicted in FIG. 19I involve a scanning of partitioned character regions. Instead of transitions, the scanning determines a depth, in pixels from a character boundary before the scan reaches a black pixel. Test f(10) is a top half scan from the left, test f(11) is a bottom half scan from the left, test f(12) is a top half scan from the right and test f(13) is a bottom half scan from the left.

FIG. 19J depicts a vertical scan for four tests f(14), f(15), f(16), and f(17). These four tests also monitor the depth into the character to which one must scan before reaching a black pixel. Test f(14) is from the bottom for the left hand side of the character, f(15) is from the bottom for the right hand side of the character, f(16) is from the top for the left hand side and f(17) is for the top and the right hand side. FIG. 19K depicts the tests for functions f(18) and f(19). This is a scan into the character of the middle third from the left and the right respectively. FIG. 19L is a scan of the middle third from the top to define f(21) and from the bottom to define f(20).

FIGS. 19M–19P define tests f(22), f(26), f(27), f(30) that are based on the area of the character pixels (in square pixels) as a denominator and the number of black pixels as a numerator. The tests in FIGS. 19Q–19S are tests that are based on the perimeter of the bounding character region and the number of black pixels that define the character within that region.

Returning to the tree classifier of FIG. 21, a first or root decision step 532 contains five functional tests. Two branches based on the first decision step 532 lead to two tree nodes 534, 536 at a second level of the tree. The results of the various tests f(0), f(1) . . . for a given foot are tabulated in FIGS. 20A–20C for the ten digits 0–9. As an example test f(0) for the digit '0' for this font is calculated to be 1.81. We adopt the notation $f_i[k]$, where i is the ith test and k is the kth digit. Using this notation $f_0[0]$ is 1.81. Similarly, by referring to the tables of FIG. 20 one can determine that $f_0[3]=1.37$ and $f_4[5]=1.75$.

For every input or unknown character, the five features or functions found in the first decision step 532 are determined. Refer to these tests as $f_0[?]$, $f_3[?]$, $f_4[?]$, $f_{14}[?]$, $f_{33}[?]$.

Now define the term $m_0[1,7]=(f_0[1]+f_0[7])/2$; and
$m_0[0,2,3,4,5,6,8,9]=(f_0[0]+f_0[2]+f_0[3]+f_0[4]+f_0[5]+f_0[6]+f_0[8]+f_0[9])/8$ Using these defintions;
$m_3[1,7]=(f_3[1]+f_3[7])/2=1.19$; and
$m_3[0,2,3,4,5,6,8,9]=(f_3[0]+ \ldots +f_3[9])/8$.

The decision tree at step 532 involves the calculation of the summation of differences:

$$dif(a,b)=\Sigma abs(m(x)[a,b]-f(x)[?]).$$

Where abs means take the absolute value and the summation is over the different functions for x=0, 3, 4, 14, 33. Thus, for the decision tree of FIG. 21, there will be two calculations at the step 532 of the tree:

dif(1,7)[node 532]=abs($f_0[?]-m_0[1,7]$)+abs($f_3[?]-m_3[1,7]$)+abs($f_4[?]-m_3[1,7]$)+abs($f_{14}[?]-m_{14}[1,7]$)+abs($f_{33}[?]-m_{33}[1,7]$) and in a similar fashion:

dif(0,2,3,4,5,6,8,9)[node 532]=abs($f_0[?]$-m 0 [0,2,3,4,5,6,8,9])+ . . .

The descision at the node 532 branches in one or two directions based upon the following test:

if dif(1,7)[node 532]<dif(0,2,3,4,5,6,8,9)[node 532] then the unknown character could be either a character '1' or a characaker '7' so a branch to the left in the decision tree to the node 534 is taken. If dif(1,7)[node 532]>= dif(0,2,3,4,5,6,8,9)[node 532] then a branch to the right to the node 536 is taken.

Assume a left branch to the decision step 534 is taken. The character is either a '1' or a '7'. The following functions or features are then computed:

$f_{13}[?]$, $f_{15}[?]$, $f_{19}[?]$, $f_{28}[?]$, $f_{32}[?]$, $f_{33}[?]$.

From these feature calculations the values of dif(1) [node 534] and dif(7) [node 534] can be calculated. If dif(1)<dif(7), then the unknown input character is a one '1' since a leaf in the decision tree has been reached. Otherwise the character is a seven '7'.

It is noted that in the decision step 534 for the test of f(32) the function is doubled. This means that test is weighted more heavily than the other tests of the second level decision step 534.

The decision tree is a complete classification system for the digits 0–9. The maximum number of nodes that need be traveled for each unknown character is 8 (to discriminate between a 6 and an 8) and the minimum number of nodes that have to be traversed is two (to discriminate between a 1 and a 7).

If alphabetical characters are also classified, then the decision tree becomes much larger since the hand held device must be capable of distinguishing between a large number of characters. With use of a microprocessor controller, however, the amount of calculations for a much larger decision tree is not excessive and the total time to determine a relatively large block of text is not unreasonable. As noted above the characters take up a minimal amount of memory to store and once they have been determined they are either saved on the device 10 or transmitted in serial fashion to another location.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

I claim:

1. Portable data collection apparatus comprising:
  a) a housing that defines an internal region and includes a user handle that allows a user to position the housing relative to an indicia carrying target;
  b) an imaging assembly including a two dimensional imaging array supported within the internal region of the housing, the imaging assembly including a capture circuit that generates a video signal representative of an image of a target zone;
  c) an optics assembly supported by the housing for focusing an image of the target area onto the imaging array; and
  d) the imaging assembly operable in a selected one of a dataform reading mode and an imaging mode, the imaging assembly including image processing circuitry for interpreting the imaged indicia in the target zone as a dataform when the imaging assembly is operated in the dataform reading mode and character recognition processing circuitry for receiving the video signal and converting imaged indicia in the target zone into a set of predefined characters when the imaging assembly is operated in the imaging mode, the character recognition processing circuitry including:
    i) a discriminator for identifying a text region of the image of the target and identifying individual character regions within the text region; and
    ii) a categorizer for identifying a character from a set of possible characters for an individual character region, said categorizer performing one or more tests based on pixel data within the individual character region.

2. The apparatus of claim 1 wherein the imaging assembly further includes selection circuitry that includes a dataform reading switch selectively actuated by a user of the apparatus to operate the imaging assembly in the dataform reading mode and initiate a dataform recognition function and an imaging switch selectively actuated by a user of the apparatus to operate the imaging assembly in the imaging mode and initiate a text recognition function.

3. The apparatus of claim 2 wherein, upon actuation of the imaging switch the capture circuit determines a text frame within an image frame.

4. The apparatus of claim 1 wherein the character recognition processing circuitry implements a tree classifier for assigning character values to image regions based on the picture element content of the image regions.

5. The apparatus of claim 4 wherein the tree classifier is defined by multiple nodes that discriminate between different characters based upon one or more feature lists.

6. A method for recognizing characters within a region of a two dimensional captured image frame generated by a two dimension image array comprising the steps of:

a) receiving a video signal representative of the captured image frame and generating greyscale representations of image picture elements of the captured image frame;

b) identifying a text region within the image frame based upon a contrast value assigned to different areas that combine to make up the image;

c) converting greyscale representations for each picture element within the text region into a binary representation for such picture element;

d) identifying a subregion within a text region of said image frame as a bounding box for a character;

e) evaluating the picture elements within the bounding box based on an initial functional test that forms a partial classification of a character based on pixel data within the bounding box;

f) repeating one or more additional functional tests that are determined based upon the partial classification of the initial functional test to completely classify a character within the bounding box; and g) identifying and classifying characters contained within other bounding boxes within the text region.

7. The method of claim 6 wherein multiple functional subtests make up the initial and additional functional tests used in classifying a character within a bounding box.

8. The method of claim 7 wherein the initial and additional functional test make up a decision tree for classifying a character within a bounding box.

9. The method of claim 8 wherein the decision tree includes decision steps that branch based on how a particular character font depicts the characters of said font.

10. The method of claim 6 wherein the bounding box is made up of multiple pixels and the function tests involve statistical calculations for the multiple pixels that are chosen to classify characters within the bounding box.

11. The method of claim 6 additionally comprising a step of re-orienting the text region prior to beginning a process of optical character recognition.

12. A portable data collection device including a two dimensional imaging assembly operable in a selected one of a dataform reading mode to decode a dataform within a target area and a character reading mode to convert text within the target area into a set of predefined characters, the imaging assembly comprising:

a) the two dimensional imaging assembly including a two dimensional photosensor array supported within an interior region of a housing, the imaging assembly when actuated generating a composite video signal representative of successive frames of an image of the target area;

b) an optics assembly supported by the modular housing for focusing an image of the target area onto the photosensor array; and c) the imaging assembly further including image processing circuitry receiving the composite video signal, the image processing circuitry including:

i) an analog to digital converter for converting a portion of the composite video signal corresponding to an image frame into a set of digital data representative of an image of the target area;

ii) conversion circuitry for converting the digital data into a set of digital gray scale values;

iii) cell extraction circuitry receiving the set of digital gray scale values and generating a set of binary values, each binary value corresponding to a different set of one or more image pixels of the image frame;

iv) dataform recognition and decoding circuitry electrically actuable by a dataform reader switch to read a dataform within the target area including selecting a subset of binary values from the set of binary values corresponding to an image of the dataform within a portion of the image frame and decoding a representation of the image of the dataform generated from the selected subset of binary values to generate decoded dataform data; and v) an optical character recognition circuit electrically actuable by an imaging switch to capture an image within the target area including selecting a subset of binary values from the set of binary values corresponding to a text area within a portion of the image frame and generating image data corresponding to the image of the text area, the imaged text area being bounded by a contrasting reflectivity border region.

13. The portable data collection device of claim 12 wherein selected binary values generated by the optical character recognition circuit are associated with a character to be recognized.

14. The portable data collection device of claim 12 wherein the optical character recognition circuit implements a classifier based upon multiple functions that discriminate between character shapes.

15. A portable data collection device comprising:

a) a modular camera assembly including a photosensor array having a two dimensional array of photosensors, the photosensors of the array of photosensors being read out after an exposure period to generate an analog video signal representative of an image of a target area, the target area including either text or a target dataform;

b) a camera assembly housing for supporting components of the modular camera assembly;

c) an optic assembly including a lens assembly supported within a shroud assembly and positioned to focus illumination reflected from the target area onto the array of photosensors, the optic assembly having a best focus position at a predetermined distance from an outwardly facing optic surface of an outermost lens which results in a clearest image of the target area being focused onto the array of photosensors;

d) an illumination assembly supported within the housing and directing illumination towards the target area and including a lens array having a plurality of optic surfaces for directing illumination generated by illumination sources toward an illumination area substantially congruent with the target area; and e) analog to digital conversion circuitry for converting the analog video signal into a set of gray scale values, a magnitude of a given gray scale value proportional to an intensity of illumination incident on a given photosensor of the array of photosensors during the exposure period, the intensity of illumination incident on the given photosensor dependent upon a transmittivity of the filter element overlying the given photosensor;

f) binarization circuitry for generating a set of binary picture element values based on gray scale values of the picture elements; and g) image processing and decoding circuitry receiving as input the binary picture elements operable in a selected one of a dataform reading mode and an imaging mode, in the dataform reading mode, the image processing and decoding circuitry decoding an image of the target dataform, in the imaging mode, the image processing and decoding converting an image of text into a set of predefined characters.

* * * * *